(12) United States Patent
Kalafut et al.

(10) Patent No.: US 8,608,484 B2
(45) Date of Patent: Dec. 17, 2013

(54) DYNAMIC ANTHROPOMORPHIC CARDIOVASCULAR PHANTOM

(75) Inventors: John F. Kalafut, Pittsburgh, PA (US); David M. Reilly, Pittsburgh, PA (US); Michael J. Yanniello, Cheswick, PA (US)

(73) Assignee: MEDRAD, Inc., Indianola, PA (US)

( * ) Notice: Subject to any disclaimer, the term of this patent is extended or adjusted under 35 U.S.C. 154(b) by 1166 days.

(21) Appl. No.: 12/397,713

(22) Filed: Mar. 4, 2009

(65) Prior Publication Data

US 2009/0226867 A1 Sep. 10, 2009

Related U.S. Application Data

(60) Provisional application No. 61/033,761, filed on Mar. 4, 2008.

(51) Int. Cl.
*G09B 23/28* (2006.01)

(52) U.S. Cl.
USPC ........... 434/268; 434/262; 434/267; 600/419; 600/480; 600/481; 600/410

(58) Field of Classification Search
USPC ................ 434/262, 268, 267; 607/4–8, 9, 24; 600/480, 481, 419
See application file for complete search history.

(56) References Cited

U.S. PATENT DOCUMENTS

| | | |
|---|---|---|
| 3,701,345 A | 10/1972 | Heilman et al. |
| 3,812,843 A | 5/1974 | Wootten et al. |
| 3,888,239 A | 6/1975 | Rubinstein |
| 3,898,983 A | 8/1975 | Elam |
| 3,941,126 A | 3/1976 | Dietrich et al. |
| 4,090,502 A | 5/1978 | Tajika |
| 4,135,247 A | 1/1979 | Gordon et al. |
| 4,151,845 A | 5/1979 | Clemens |
| 4,187,057 A | 2/1980 | Xanthopoulos |
| 4,191,183 A | 3/1980 | Mendelson |

(Continued)

FOREIGN PATENT DOCUMENTS

| | | |
|---|---|---|
| CA | 2045070 A1 | 2/1992 |
| EP | 0619122 A1 | 10/1994 |

(Continued)

OTHER PUBLICATIONS

Awai, K. et al, "Simulation of Aortic Peak Enhancement on MDCT using a Contrast Material Flow Phantom, feasibility study", AJR Am J. Roentgenol, 2006. 186(2): pp. 379-385.

(Continued)

*Primary Examiner* — Xuan Thai
*Assistant Examiner* — Banafsheh Hadizonooz
(74) *Attorney, Agent, or Firm* — James Stevenson; Henry E. Bartony, Jr.; Greg Bradley

(57) ABSTRACT

A cardiovascular flow system includes: a cardiovascular model system, a pump system in fluid connection with the cardiovascular model system, and an ECG simulator in communicative connection with the pump system. The ECG simulator system is adapted to create and transmit a simulated ECG signal. The ECG simulator system uses a signal received from the pump system to adjust the simulated ECG signal transmitted from the ECG simulator system. The cardiovascular flow system further includes an injection port adapted to be placed in fluid connection with an injector to inject at least one fluid into the system.

31 Claims, 15 Drawing Sheets

(56) References Cited

U.S. PATENT DOCUMENTS

| | | |
|---|---|---|
| 4,207,871 A | 6/1980 | Jenkins |
| 4,280,494 A | 7/1981 | Cosgrove, Jr. et al. |
| 4,315,520 A | 2/1982 | Atkinson et al. |
| 4,319,568 A | 3/1982 | Tregoning |
| 4,340,153 A | 7/1982 | Spivey |
| 4,392,849 A | 7/1983 | Petre et al. |
| 4,396,385 A | 8/1983 | Kelly et al. |
| 4,402,310 A | 9/1983 | Kimura |
| 4,409,966 A | 10/1983 | Lambrecht et al. |
| 4,444,198 A | 4/1984 | Petre |
| 4,447,230 A | 5/1984 | Gula et al. |
| 4,477,923 A | 10/1984 | Baumann et al. |
| 4,479,761 A | 10/1984 | Bilstad et al. |
| 4,512,764 A | 4/1985 | Wunsch |
| 4,544,949 A | 10/1985 | Kurihara |
| 4,551,133 A | 11/1985 | Zegers de Beyl et al. |
| 4,559,036 A | 12/1985 | Wunsch |
| 4,563,175 A | 1/1986 | LaFond |
| 4,585,009 A | 4/1986 | Barker et al. |
| 4,611,340 A | 9/1986 | Okazaki |
| 4,633,307 A | 12/1986 | Honda |
| 4,634,426 A | 1/1987 | Kamen |
| 4,636,144 A | 1/1987 | Abe et al. |
| 4,655,197 A | 4/1987 | Atkinson |
| 4,672,651 A | 6/1987 | Horiba et al. |
| 4,710,166 A | 12/1987 | Thompson et al. |
| 4,723,261 A | 2/1988 | Janssen et al. |
| 4,750,643 A | 6/1988 | Wortrich |
| 4,754,786 A | 7/1988 | Roberts |
| 4,783,273 A | 11/1988 | Knutsson et al. |
| 4,795,429 A | 1/1989 | Feldstein |
| 4,798,590 A | 1/1989 | O'Leary et al. |
| 4,838,856 A | 6/1989 | Mulreany et al. |
| 4,840,620 A | 6/1989 | Kobayashi et al. |
| 4,853,521 A | 8/1989 | Claeys et al. |
| 4,854,324 A | 8/1989 | Hirschman et al. |
| 4,857,056 A | 8/1989 | Talonn |
| 4,874,359 A | 10/1989 | White et al. |
| 4,880,014 A | 11/1989 | Karowitz et al. |
| 4,887,554 A | 12/1989 | Whitford |
| 4,903,705 A | 2/1990 | Imamura et al. |
| 4,913,154 A | 4/1990 | Ermert et al. |
| 4,925,444 A | 5/1990 | Orkin et al. |
| 4,943,279 A | 7/1990 | Samiotes et al. |
| 4,946,439 A | 8/1990 | Eggers |
| 4,966,579 A | 10/1990 | Polaschegg |
| 5,009,654 A | 4/1991 | Minshall et al. |
| 5,018,173 A | 5/1991 | Komai et al. |
| 5,032,112 A | 7/1991 | Fairchild et al. |
| 5,034,987 A | 7/1991 | Fujimoto et al. |
| 5,040,537 A | 8/1991 | Katakura |
| 5,078,683 A | 1/1992 | Sancoff et al. |
| 5,088,981 A | 2/1992 | Howson et al. |
| 5,104,374 A | 4/1992 | Bishko et al. |
| 5,111,492 A | 5/1992 | Klausz |
| 5,128,121 A | 7/1992 | Berg et al. |
| 5,135,000 A | 8/1992 | Akselrod et al. |
| 5,180,896 A | 1/1993 | Gibby et al. |
| 5,301,672 A | 4/1994 | Kalender |
| 5,310,997 A | 5/1994 | Roach et al. |
| 5,317,506 A | 5/1994 | Coutre et al. |
| 5,328,463 A | 7/1994 | Barton et al. |
| 5,339,799 A | 8/1994 | Kami et al. |
| 5,349,625 A | 9/1994 | Born et al. |
| 5,361,761 A | 11/1994 | Van Lysel et al. |
| 5,368,562 A | 11/1994 | Blomqquist et al. |
| 5,378,231 A | 1/1995 | Johnson et al. |
| 5,382,232 A | 1/1995 | Hague et al. |
| 5,383,858 A | 1/1995 | Reilly et al. |
| 5,385,540 A | 1/1995 | Abbott et al. |
| 5,400,792 A | 3/1995 | Hoebel et al. |
| 5,417,213 A | 5/1995 | Prince |
| 5,431,627 A | 7/1995 | Pastrone et al. |
| 5,445,621 A | 8/1995 | Poli et al. |
| 5,456,255 A | 10/1995 | Abe et al. |
| 5,458,128 A | 10/1995 | Polanyi et al. |
| 5,459,769 A | 10/1995 | Brown |
| 5,469,769 A | 11/1995 | Sawada et al. |
| 5,472,403 A | 12/1995 | Cornacchia et al. |
| 5,474,683 A | 12/1995 | Bryant et al. |
| 5,485,831 A | 1/1996 | Holdsworth et al. |
| 5,494,036 A | 2/1996 | Uber, III et al. |
| 5,494,822 A | 2/1996 | Sadri |
| 5,496,273 A | 3/1996 | Pastrone et al. |
| 5,507,412 A | 4/1996 | Ebert et al. |
| 5,515,851 A | 5/1996 | Goldstein |
| 5,522,798 A | 6/1996 | Johnson et al. |
| 5,531,679 A | 7/1996 | Schulman et al. |
| 5,569,181 A | 10/1996 | Heilman et al. |
| 5,573,515 A | 11/1996 | Wilson et al. |
| 5,583,902 A | 12/1996 | Bae |
| 5,632,623 A * | 5/1997 | Kolff et al. .................... 434/272 |
| 5,687,208 A | 11/1997 | Bae et al. |
| 5,713,358 A | 2/1998 | Mistretta et al. |
| 5,724,976 A | 3/1998 | Mine et al. |
| 5,743,266 A | 4/1998 | Levene et al. |
| 5,768,405 A | 6/1998 | Makram-Ebeid |
| 5,840,026 A | 11/1998 | Uber et al. |
| 5,865,744 A | 2/1999 | Lemelson |
| 5,881,124 A | 3/1999 | Giger et al. |
| 5,916,197 A | 6/1999 | Reilly et al. |
| 6,009,342 A | 12/1999 | Brasch et al. |
| 6,055,985 A | 5/2000 | Bae et al. |
| 6,062,866 A * | 5/2000 | Prom ............................ 434/268 |
| 6,197,000 B1 | 3/2001 | Reilly et al. |
| 6,201,889 B1 | 3/2001 | Vannah |
| 6,205,871 B1 * | 3/2001 | Saloner et al. ............... 73/866.4 |
| 6,236,706 B1 | 5/2001 | Hsieh |
| 6,317,623 B1 | 11/2001 | Griffiths et al. |
| 6,344,030 B1 | 2/2002 | Duchon et al. |
| 6,385,483 B1 | 5/2002 | Uber, III et al. |
| 6,397,098 B1 | 5/2002 | Uber, III et al. |
| 6,470,889 B1 | 10/2002 | Bae et al. |
| 6,471,674 B1 | 10/2002 | Emig et al. |
| 6,478,735 B1 | 11/2002 | Pope et al. |
| 6,522,913 B2 | 2/2003 | Swanson et al. |
| 6,556,695 B1 | 4/2003 | Packer et al. |
| 6,626,862 B1 | 9/2003 | Duchon et al. |
| 6,635,030 B1 | 10/2003 | Bae et al. |
| 6,643,537 B1 | 11/2003 | Zatezalo et al. |
| 6,656,157 B1 | 12/2003 | Wilson et al. |
| 6,673,033 B1 | 1/2004 | Sciulli et al. |
| 6,731,971 B2 | 5/2004 | Evans, III et al. |
| 6,776,764 B2 | 8/2004 | Pinsky |
| 6,901,283 B2 | 5/2005 | Evans, III et al. |
| 6,970,735 B2 | 11/2005 | Uber, III et al. |
| 7,094,216 B2 | 8/2006 | Trombley, III et al. |
| 7,326,186 B2 | 2/2008 | Trombley, III et al. |
| 7,925,330 B2 | 4/2011 | Kalafut et al. |
| 7,996,381 B2 | 8/2011 | Uber, III et al. |
| 8,016,598 B2 * | 9/2011 | Eggert et al. ................ 434/268 |
| 8,055,328 B2 | 11/2011 | Uber, III et al. |
| 8,197,437 B2 | 6/2012 | Kalafut et al. |
| 8,295,914 B2 | 10/2012 | Kalafut et al. |
| 2003/0135111 A1 | 7/2003 | Meaney et al. |
| 2003/0212364 A1 | 11/2003 | Mann et al. |
| 2003/0216683 A1 | 11/2003 | Shekalim |
| 2004/0010229 A1 | 1/2004 | Houde et al. |
| 2004/0025452 A1 | 2/2004 | McLean |
| 2004/0033477 A1 * | 2/2004 | Ramphal et al. ............. 434/272 |
| 2004/0064040 A1 | 4/2004 | Masuda et al. |
| 2004/0097875 A1 | 5/2004 | Bae |
| 2004/0162484 A1 | 8/2004 | Nemoto |
| 2004/0215144 A1 | 10/2004 | Duchon et al. |
| 2004/0254525 A1 * | 12/2004 | Uber et al. ...................... 604/67 |
| 2007/0282263 A1 | 12/2007 | Kalafut et al. |
| 2008/0293025 A1 * | 11/2008 | Zamierowsi et al. ......... 434/262 |
| 2008/0293029 A1 * | 11/2008 | Wilkins et al. ............... 434/272 |

FOREIGN PATENT DOCUMENTS

| | | |
|---|---|---|
| JP | 60194934 A | 10/1985 |
| WO | 8500292 A1 | 1/1985 |
| WO | 8803815 A1 | 6/1988 |

(56) References Cited

FOREIGN PATENT DOCUMENTS

| WO | 9415664 A1 | 7/1994 |
|---|---|---|
| WO | 9820919 A1 | 5/1998 |
| WO | 0061216 A1 | 10/2000 |

OTHER PUBLICATIONS

Kalafut, J.F. et al, "An Anthropomorphic, Cardiovascular Flow Phantom for CT Contrast and Imaging Protocol Optimization", ECR 2008, EPOS, Scientific Exhibit, pp. 13.
Bae, K.T. et al, "Peak Contrast Enhancement in CT and MR Angiography: When Does it Occur and Why? Pharmacokinetic Study in a Porcine Model", Radiology, Jun. 2003, pp. 809-816.
Cademartini, F. and Luccichenti, G., et al (2004) "Sixteen-Row Multislice Computed Tomography: Basic Concepts, Protocols, and Enhanced Clinical Application," Semir Ultrasound CT MR 25(1):2-16.
K.T. Bae, J.P. Heiken and J.A. Brink, "Aortic and Hepatic Contrast Medium Enhancement at CT Part I. Prediction and a Computer Model." Radiology, vol. 207, pp. 647-655, 1998.
K.T. Bae, "Peak Contrast Enhancement in CT and MR Angiography: When Does It Occur and Why? Pharmacokinetic Study in a Porcine Model", Radiology. vol. 227, pp. 809-816, 2003.
K.T. Bae et al., "Multiphasic Injection Method for Uniform Prolonged Vascular Enhancement at CT Angiography: Pharmacokinetic Analysis and Experimental Porcine Method," Radiology, vol. 216, pp. 872-880, 2000.
D. Fleischmann and K. Hittmair, "Mathematical Analysis of Arterial Enhancement and Optimization of Bolus Geometry for CT Angiography Using the Discrete Fourier Transform", J Comput Assist Tomogr, vol. 23, pp. 474-484, 1999.
Fisher and Teo, "Optimal Insulin Infusion Resulting from a Mathematical Model of Blood Glucuose Dynamics," IEEE Trans Biomed Eng. vol. 36(4). pp. 479-486, 1989.
Jacobs, "Algorithm for Optimal Linear Model-Based Control with Application to Pharmacokinetic Model-Driven Drug Delivery", IEEE Trans Biomed Eng. vol. 37(1), pp. 107-109, 1990.
Wada and Ward, "The Hybrid Model: A New Pharmacokinetic Model for Computer-Controlled Infusion Pumps", IEEE Trans. Biomed. Eng. vol. 41(2), pp. 134-142, 1994.
Wada and Ward, "Open Loop Control of Multiple Drug Effects in Anesthesia", IEEE Trans. Biomed Eng. vol. 42(7), pp. 666-677, 1995.
Neatpisamvanit and Boston, "Estimation of Plasma Insulin from Plasma Glucose", IEEE Trans Biomed Eng. vol. 49 (11), pp. 1253-1259, 2002.
Gentilini et al., "A New Paradigm for the Closed-Loop Intraoperative Administration of Analgesics in Humans", IEEE Tran Biomed Eng. vol. 49(4). pp. 289-2999, 2002.
Garrett, J.S., Lanzer, P., et al., "Measurement of Cardiac Output by Cine Computed Tomography", Am J Cardiol 56 (10): 657-61, 1985.
Mahnken, A.H., Henzler, D, et al., "Determination of Cardiac Output with Multislice Spiral Computed Tomography: A Validation Study", Invest Radiol 39(8): 451-4, 2004.
Mahnken, A.H., Klotz, E, et al., "Measurement of Cardiac Output from a Test-Bolus Injection in Multislice Computed Tomography", Eur Radiol 13(11): 2498-504, 2003.
International Search Report and Written Opinion for counterpart PCT Application No. PCT/US2005/41913, 2004.
Fleischmann, Dominik, "Present and Future Trends in Multiple Detector-Row CT Applications; CT Angiography", Eur. Radiol. 12 (Suppl. 2) 2002.
Korosec, Frank, "Basic Principles of Phase-contrast, Time-of-flight, and Contrast-enhanced MR Angiography", 1999.
Baker, Aaron; et al. "Fluid Mechanics Analysis of a Spring-Loaded Jet Injector." IEEE Transactions on Biomedical Engineering, vol. 46, No. 2, Feb. 1899.
Guytan, A.C., "Circulatory Physiology: Cardiac Output and Regulation", Saunders, Philadelphia, p. 173, ISBN: 07216436004, Nov. 2004.
Becker, C.R., et al., Optimal contrast application for cardiac 4-detector-row computed tomography. Invest Radiol, 2003. 38(11): p. 690-4.
Schoepf, U.J., et al., Coronary CT angiography. Radiology, 2007. 244(1): p. 48-63.
Johnson, T.R. et al., Optimization of contrast material administration for electrocardiogram-gated, 2007.
Fleischmann, D. and K. Hittmair, Mathematical analysis of arterial enhancement and optimization of bolus geometry for CT angiography using the discrete fourier transform. J Com put Assist Tomogr, 1999. 23(3):p. 474-84.
Awai, K., et al., Prediction of aortic peak enhancement in monophasic contrast injection protocols at multidetector CT; phantom and patient studies. Radiat Med, 2007.25(1 ):p. 14-21.
Bae, K.T., J.P. Heiken, and J.A. Brink, Aortic and hepatic contrast medium enhancement at CT. Part II. Effect of reduced cardiac output in a porcine model. Radiology, 1998. 207(3):p. 657-62.

* cited by examiner

Figure 1D
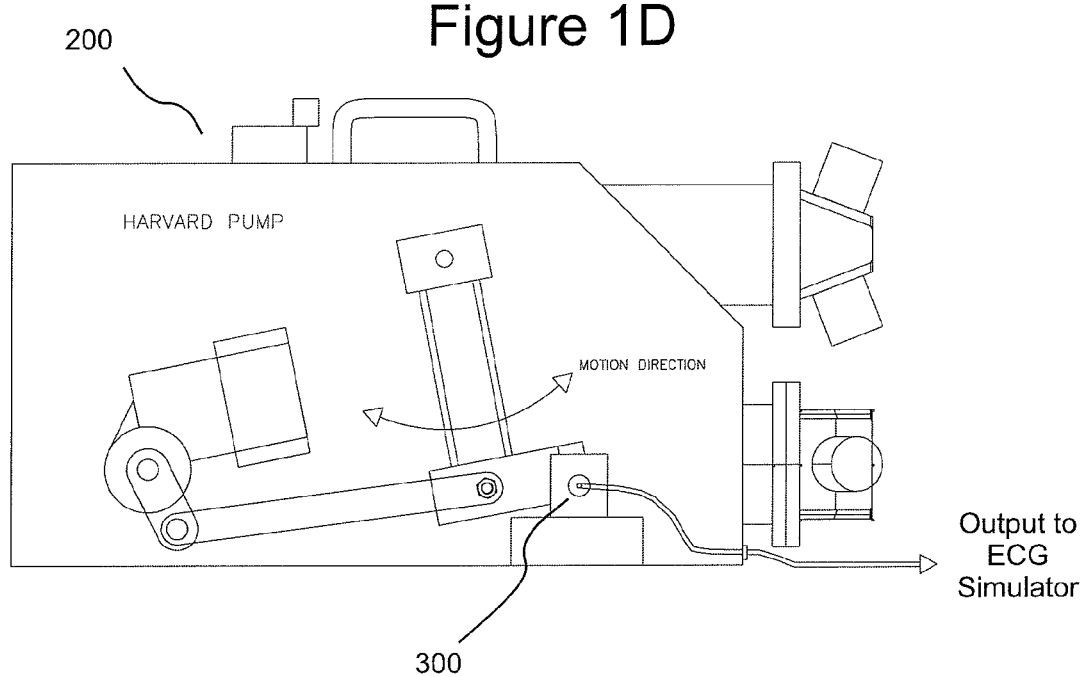
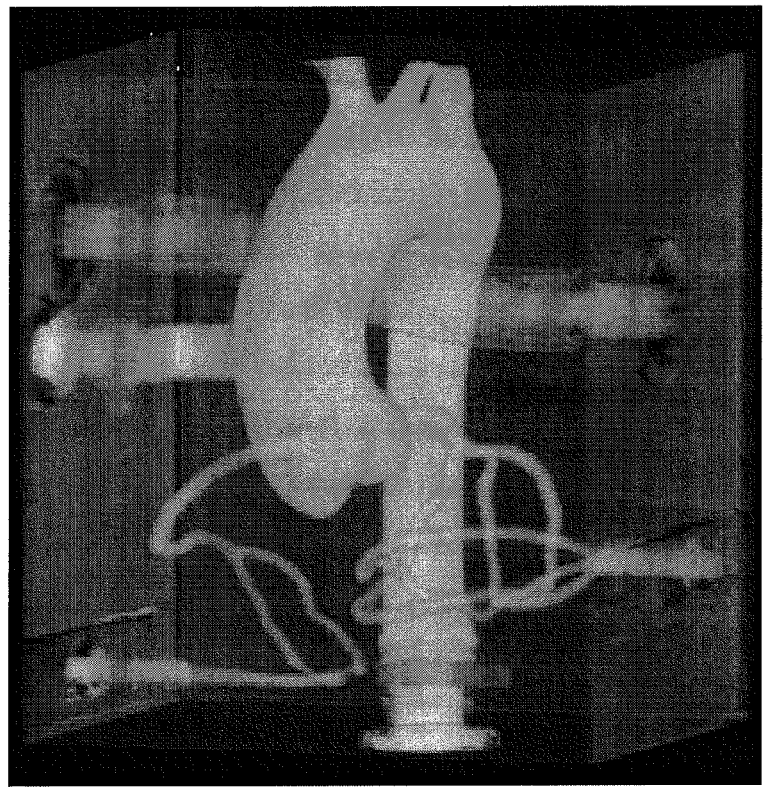
Figure 1C

DYNAMIC ANTHROPOMORPHIC CARDIOVASCULAR PHANTOM

CROSS-REFERENCE TO RELATED APPLICATIONS

This application claims benefit of U.S. Provisional Patent Application Ser. No. 61/033,761, filed Mar. 4, 2008, the disclosure of which is incorporated herein by reference.

BACKGROUND OF THE INVENTION

The present invention relates to a dynamic anthropomorphic cardiovascular phantom, model or system and, particularly, a dynamic anthropomorphic cardiovascular phantom for simulating injectable fluid propagation.

The following information is provided to assist the reader to understand the invention disclosed below and the environment in which it will typically be used. The terms used herein are not intended to be limited to any particular narrow interpretation unless clearly stated otherwise in this document. References set forth herein may facilitate understanding of the present invention or the background of the present invention. The disclosure of all references cited herein is incorporated by reference.

Computed tomography (CT) is a medical imaging technique in which digital geometry processing is used to generate a three-dimensional imaging of a region of interest (ROI) within a body from a series of two-dimensional X-ray images taken around a single axis of rotation. A contrast medium injected into the patients venous system is typically used to enhance the contrast of various structures and/or fluids within the region of interest. The development of subsecond rotation and multi-slice CT of MSCT (for example, up to 64-slice) has provided both high resolution and high speed. Moreover, images with even higher temporal resolution can be generated using electrocardiogram (ECG) gating to correlate CT data with corresponding phases of cardiac contraction.

As MSCT enables the acquisition of sub-millimeter slices and near isotropic voxels, anatomical territories previously unacquirable are now almost routinely imaged. In particular, dynamic structures such as the coronary vasculature, are able to be imaged as a result of the MSCT scanner's ability to acquire a volumetric data set in 5-20 seconds, well within the breath-hold interval of most patients. Furthermore, the latest generation of MSCT also enables cardiac CT even in the presence of high heart-rates and arrhythmia. Cardiac CT Angiography (CCTA) is therefore a demanding imaging regime in which the clinician must perfect her technique to maximize image quality.

Intrinsic to the quality of a CCTA exam is the proper dosing, delivery, and timing of the iodinated contrast bolus required for image contrast enhancement. Because CCTA is only concerned with arterial imagery during the first-pass of the contrast bolus, the timing of the scanner acquisition relative to the peak contrast enhancement in the cardiac anatomy is important. There are many published works demonstrating the benefits of personalizing and optimizing the delivery of contrast material to the individual and the image procedure. In the case of CCTA with MSCT scanners, the optimization and timing of the contrast bolus is crucial.

The widespread clinical adoption of multi-slice CT has lead to challenges in adapting imaging and contrast delivery techniques which were developed in connection with single-slice, helical CT scanners. Development of optimal contrast injection techniques to generate ideal contrast enhancement has been the subject of numerous CT studies. The outcomes of such studies, however, are often not comparable and interpretation controversy arises because of variations in injection technique, parameters, and contrast medium properties. A consensus for optimal injection parameters and choice of contrast media for intravenous contrast enhancement in CT-scanning has yet to be reached and further investigation is ongoing and mandatory as scanning technology advances. To best compare different injection protocols, hemodynamic values like blood pressure, blood volume and cardiac output should ideally be held constant, as these factors significantly influence contrast enhancement. With non-uniform distribution of these factors, comparison of the contrast application is difficult to assess. Furthermore, measurements of time-enhancement curves at defined anatomic sites are required to ensure an exact analysis of contrast enhancement. To obtain a time-enhancement curve, serial CT scans at one anatomic level are necessary. However, such serial scans are not feasible in a patient study as a result of the increased radiation burden of the long acquisition time.

In an attempt to avoid the increased radiation burden and expense associated with CT patient studies, use of a flow phantom to simulate or emulate convective transport properties of the cardiovascular system has been studied. Repeated injections of contrast demonstrated some utility of the model in replicating the contrast enhancement pattern of the abdominal aorta in MSCT. Although utility was demonstrated for such a flow phantom, a number of significant limitations hinder the use of the flow phantom in developing improved CT injection protocols for contrast media.

It is, therefore, desirable to develop improved cardiovascular flow phantoms, models or systems for use in studies of the propagation of injectable fluids, including, for example, contrast media and/or other drugs.

SUMMARY OF THE INVENTION

In one aspect, a cardiovascular flow system includes: a cardiovascular model system, a pump system in fluid connection with the cardiovascular model system, and an ECG simulator in communicative connection with the pump system. The ECG simulator system is adapted to create and transmit a simulated ECG signal. The ECG simulator system uses a signal received from the pump system to adjust the simulated ECG signal transmitted from the ECG simulator system. The cardiovascular flow system further includes an injection port adapted to be placed in fluid connection with an injector to inject at least one fluid into the system.

The cardiovascular model system of the cardiovascular flow system can simulate mammalian physiologic hemodynamic parameters. For example, the hemodynamic parameters can include, but are not limited to, systolic pressure, diastolic pressure and convective transport of an injected fluid from the injection port to at least one region of interest within the cardiovascular model system.

The cardiovascular model system can additionally or alternatively simulate mammalian anatomy for at least one region of interest. The at least one region of interest can, for example, include the coronary artery tree and the thoracic aorta. The three-dimensional conformation of the region of interest can be simulated. Furthermore, movement within the at least one region of interest (for example, resulting from the heart's pulsatile pumping action) can be simulated. In that regard, motion within the region of interest can occur as a result of pulsatile flow of fluid therethrough occurs.

The ECG system can, for example, include a processing system to adjust the ECG signal to synchronize to the ECG signal to the signal received from the pump system. The ECG system can include a controller adapter to adjust timing between the ECG signal and signal received from the pump system. In several embodiments, the pump system includes a sensor (for example, a microswitch) in operative connection therewith that is adapted to provide the signal from the pump system. In a number of embodiments, the ECG system interfaces with an imaging system or scanner to transmit the simulated ECG signal to the scanner.

The cardiovascular model system can further include a lung sink (simulating flow through the lungs) and a body sink (simulating flow through several components of the body/system circulation) in fluid connection within the cardiovascular model system.

One or more interconnections within the cardiovascular model system can be formed to simulate at least one of mammalian physiology and anatomy. In several embodiments, the interconnections are selected to simulate physiologic pressure and/or convective transport.

The cardiovascular flow system can further include a kidney simulation system in fluid connection with the cardiovascular model system. The kidney system can, for example, include a first pump system to pump fresh fluid into the cardiovascular model system and a second pump system to pump fluid out of the cardiovascular system. The kidney simulation system can, for example, be controlled to control at least one of fluid volume and pressure within the cardiovascular model system.

The cardiovascular flow system can further include a pressure relief system to prevent pressure within the system from exceeding a predetermined pressure. The pressure relief system can, for example, be adapted to maintain pressure within the cardiovascular model system within limits of physiologic pressure.

In several embodiments, the cardiovascular model system includes a cardiac vasculature model including a pulmonary artery crossing the cardiac anatomy.

The cardiovascular flow system can further include the injector.

In another aspect, a method of simulating flow of an injection fluid through a mammalian cardiovascular system includes: providing a cardiovascular model, the cardiovascular model comprising an injection port adapted to be placed in fluid connection with an injector to inject the injection fluid into the cardiovascular model; pumping fluid through the cardiovascular model; configuring cardiac output, heart rate, stroke volume in the cardiovascular model; providing a simulated ECG signal, wherein the ECG signal is synchronized with pumping pulse or pumping pressure; injecting the injection fluid into the cardiovascular model via the injection port; and detecting the injection fluid in at least one region of interest within the cardiovascular model.

The synchronization can, for example, be based on an aortic pressure.

The method can further include scanning the at least one region of interest of the cardiovascular model with an imaging system to produce an image. The injection fluid can, for example, include a contrast medium (or contrast enhancement medium).

The cardiovascular model can include a coronary vasculature model, a body sink and a lung sink in fluid connection. The coronary vasculature model, the body sink and the lung sink can, for example, be in fluid connection via tubing adapted to simulate (or to enable simulation of) physiological pressures and/or convective transport.

In another aspect, a cardiovascular flow system includes: a cardiovascular model system, a pump system in fluid connection with the cardiovascular model system, an injection port adapted to be placed in fluid connection with an injector to inject at least one fluid into the system; and a kidney system or kidney simulation system in fluid connection with the cardiovascular model system. The kidney system includes a first pump system to pump fresh fluid into the cardiovascular model system and a second pump system to pump fluid out of the cardiovascular system. The first pump system and the second pump system can, for example, be controlled to prevent fluid volume increase within the cardiovascular model system upon injection of fluid into the cardiovascular model system via the injection port. The kidney system can be controlled to control pressure within the cardiovascular model system.

In a further aspect, a cardiovascular flow system includes: a cardiovascular model system, a pump system in fluid connection with the cardiovascular model system, an injection port adapted to be placed in fluid connection with an injector to inject at least one fluid into the system; and a pressure relief system to prevent pressure within the cardiovascular model system from exceeding a predetermined pressure. The pressure relief system can, for example, be adapted to maintain pressure within the cardiovascular model system within limits of physiologic pressure.

In still a further aspect, a cardiovascular flow system includes: a cardiovascular model system for simulating anatomy and physiology, a pump system in fluid connection with the cardiovascular model system, and an ECG simulator in communicative connection with the pump system. The ECG simulator system is adapted to create and transmit a simulated ECG signal. The ECG simulator system uses a signal received from the pump system to adjust the simulated ECG signal transmitted from the ECG simulator system. The cardiovascular flow system further includes an injection port adapted to be placed in fluid connection with an injector to inject at least one fluid into the system.

In several embodiments, the flow models, phantoms or systems described herein simulate or mimic the delicate anatomy of the coronary vasculature (including, for example, the coronary artery tree and the thoracic aorta) as well as the pulsatile nature of the heart and the motion resulting therefrom. The crossing of the coronary arteries by the pulmonary artery is also simulated or mimicked.

In several embodiments, an ECG simulation system interfaces with the ECG triggering or gating system of an imaging system or scanner. The flow models, phantoms or systems of the present invention also simulate or mimic physiologic hemodynamic parameters including, but not limited to, blood pressure (diastolic blood pressure, systolic blood pressure) and convective transport of an injection fluid to one or more regions of interest within the flow models, phantoms or systems. Users can also configure the system (that is, adjust one or more system variables) to achieve desired physiologic conditions.

The systems of the present invention improve characterization of the dynamics related to early-phase contrast enhancement in the cardiac and/or other anatomy to assist, for example, in the development and validation of novel, optimal contrast delivery control approaches. The systems of the present invention provide, among other things, configurable cardiac output, heart rate, stroke volume, and blood volume, accurate transport delays of an injected bolus, accurate dilution of the contrast media through a cardiopulmonary circuit, the ability to interface an ECG signal to the scanner, accurate motion of a region of interest such as the coronary tree, pressures, flow rates and other conditions within the physiologic realm, which are responsive to changes in the driving function, and pulsatile blood flow and heart rates.

The present invention, along with the attributes and attendant advantages thereof, will best be appreciated and understood in view of the following detailed description taken in conjunction with the accompanying drawings.

BRIEF DESCRIPTION OF THE DRAWINGS

FIG. 1C illustrates a reconstructed MSCT image of the CT flow phantom aortic root and coronary tree acquired with a Siemens Definition ("Dual Source") MSCT scanner, and shows details of the coronary tree model.

FIG. 1D illustrates an enlarged side, partially transparent view of a ventricular pump used to simulate the heart in the system of FIG. 1A.

DETAILED DESCRIPTION OF THE INVENTION

As used herein and in the appended claims, the singular forms "a," "an", and "the" include plural references unless the content clearly dictates otherwise. Thus, for example, reference to "a pressure transducer" includes a plurality of such pressure transducers and equivalents thereof known to those skilled in the art, and so forth, and reference to "the pressure transducer" is a reference to one or more such pressure transducers and equivalents thereof known to those skilled in the art, and so forth.

Although the anthropomorphic cardiovascular flow systems, cardiovascular phantom/model systems or flow phantoms described herein are discussed in connection with the use of contrast media in CT studies, and particularly cardiac CT angiography studies, one skilled in the art appreciates that the cardiovascular flow systems can be used to study the propagation of virtually any type of fluid that can be detected using one or more detection systems to virtually any region of interest within the cardiovascular flow system.

Figure 1A:
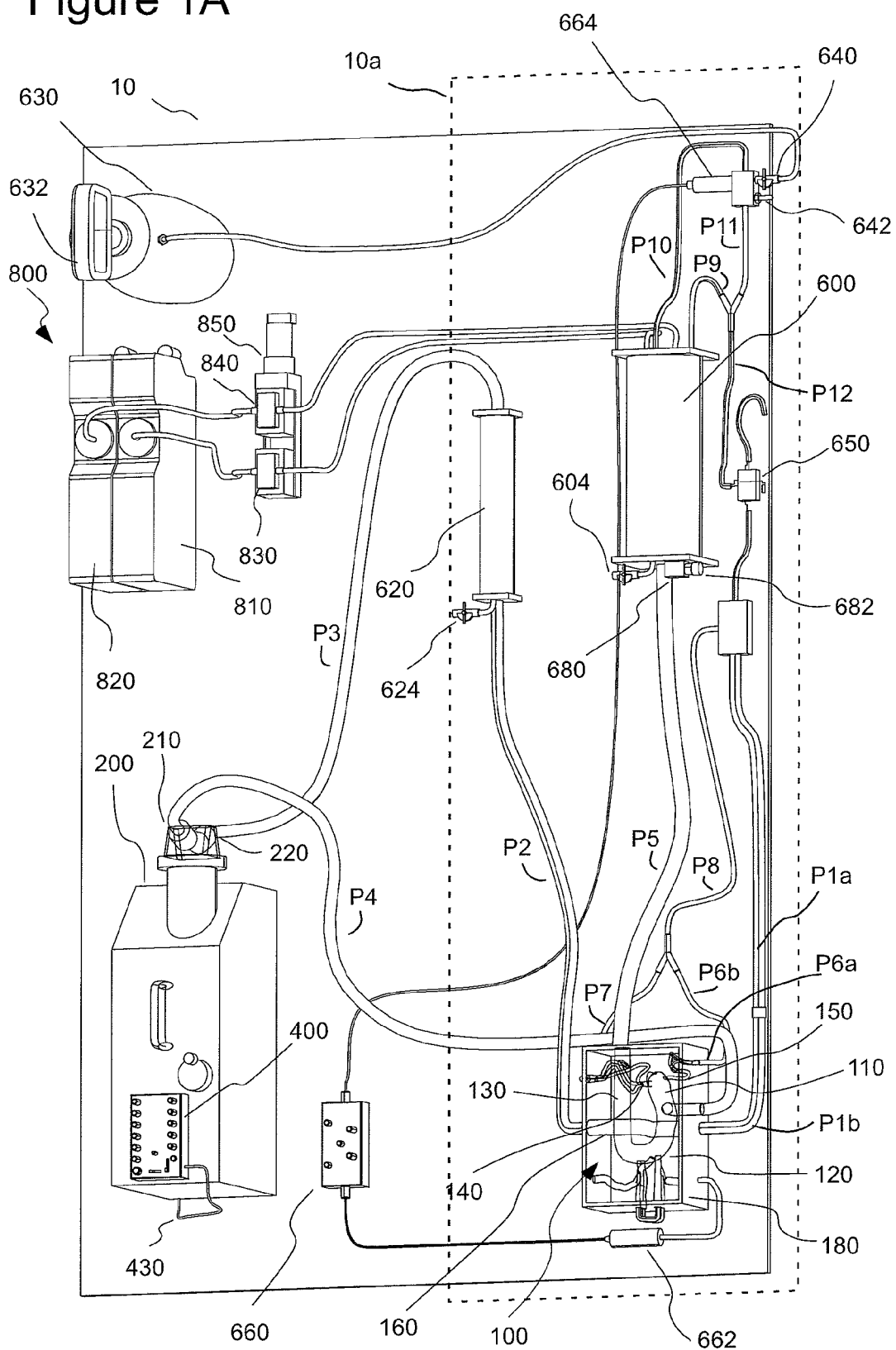
FIG. 1A illustrates a perspective view of one embodiment flow phantom system of the present invention.

FIG. 1A illustrates one embodiment of a cardiovascular flow model, phantom or system 10 of the present invention. System 10 includes a compliant, silicone coronary tree model 100 for emulating the human coronary vasculature. An example of a coronary tree model 100 suitable for use in the system 10 and used in the studies thereof described herein is the ELASTRAT Model T-S-N-002 available from Shelley Medical Inc. of London, Ontario Canada. Cardiovascular tree model 100 includes a compliant ascending aorta 110, aortic arch 120, descending aorta 130, left coronary artery 140 and right coronary artery 150. As, for example, illustrated in the scan of FIG. 1C, the right coronary artery of model 100 includes the marginal and posterior interventricular arteries. Left coronary artery 140 also includes the left anterior interventricular and the circumflex arteries. In general, model 100 closely simulates human anatomy. Such models were designed primarily for development and demonstration of stents, coils and catheters and to provide a realistic environment for the simulation of endovascular procedures, pre-surgery training, studies and teaching purposes for interventionists.

Coronary tree model 100 includes a modification that allows a model of the pulmonary artery 160 to cross the cardiac anatomy. The pulmonary artery cross enables acquisition of single-level, axial scans mimicking the contrast enhancement pattern at the pulmonary trunk in the human vascular system. System 10 incorporates the novel aspects of the pulmonary artery and aortas to generate time enhancement curves of the contrast propagation through the cardiopulmonary circuit similar to that in humans.

A ventricular pump system 200 is placed in fluid communication with coronary tree model 100 and is used too simulate the heart in system 10. A representative example of a ventricular pump suitable for use in system 10 (and used in the studies set forth herein) is the model BS4 553305 pulsatile blood pump available from Harvard Apparatus Inc. of Holliston Mass., USA (sometimes referred to as the Harvard pump). Pump system 200 can, for example, be configured to deliver stroke volumes of 15 to 100 ml, heart rates from 10 to 100 beats per minute (BPM), and systolic/diastolic ratios from 35% to 50% full cycle. Pump system 100 is designed to safely administer blood or a blood emulant, however distilled water may also be used in place of the blood emulant (that is, as a first or carrier fluid simulating blood and different from a second or injection fluid to be propagated through system 10).

Figure 1B:
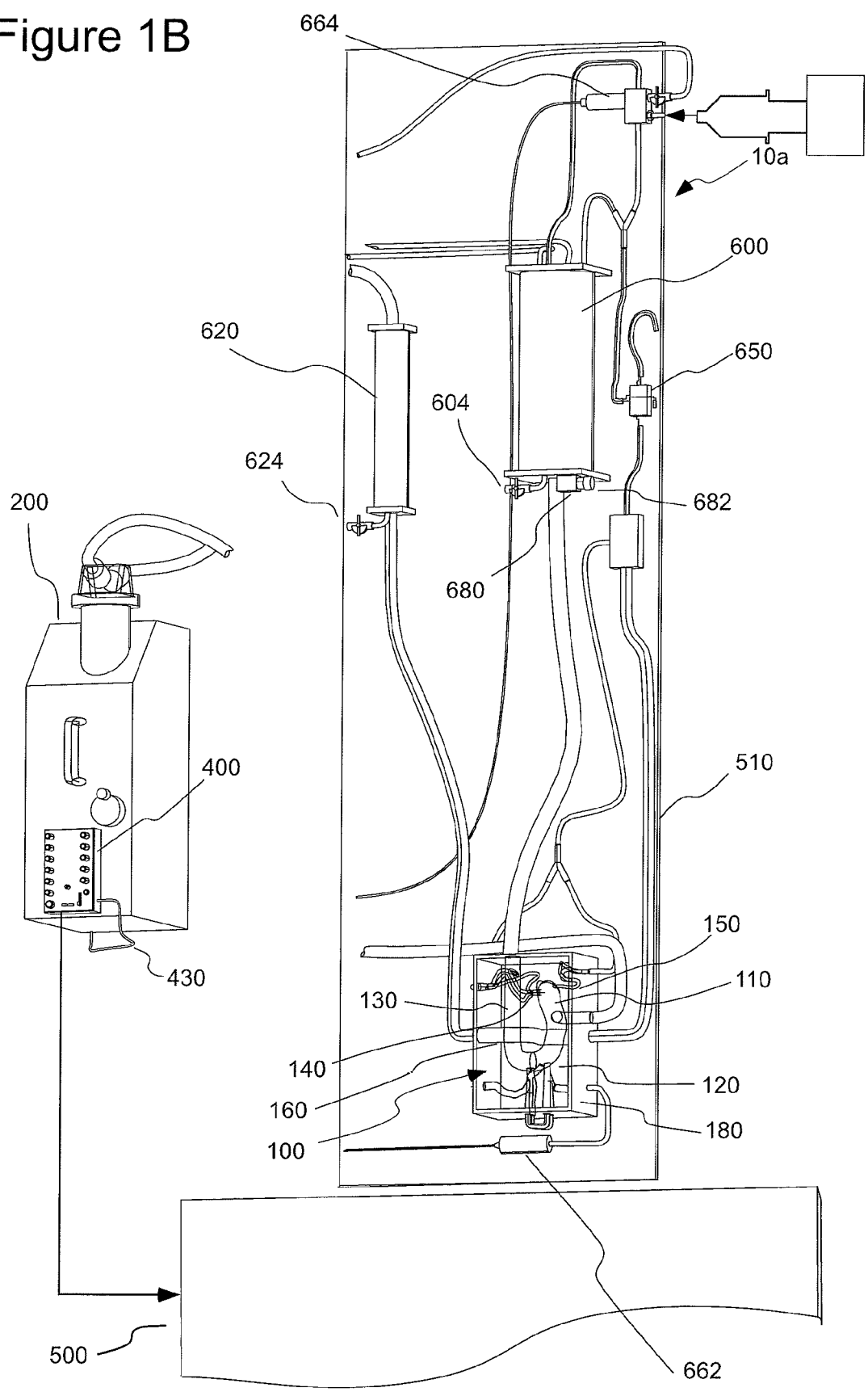
FIG. 1B illustrates a perspective view of a portion of the flow phantom system of FIG. 1A aligned to be inserted within a CT scanner.

In several embodiments, a trigger system is connected to pump system 200 to generated a trigger signal at the end of full displacement. The trigger system includes a sensor such as a microswitch 300 (see FIG. 1D) driving a MOSFET circuit that intercepts the ECG signal on an ECG simulator 400 (see, for example, FIGS. 1A, 1B and 2). A representative example of an ECG simulator 400 suitable for use in system 10 (and used in the studies set forth herein) is the ECG PLUS ECG simulator available from Bio-Tek Inc., of Winooski, Vt. USA. The trigger system entrains the simulated ECG rhythm to pump system 200, including an R-R interval that matches the duty cycle of pump system 200. Further, the drive circuits of ECG simulator 400 provide the simulated ECG signal that may be recorded by standard 3 or 5 lead ECG sets of scanner 500 (see, for example, FIG. 1B). As described further below, the ECG trace is used in the retrospective reconstruction of the cardiac data sets.

Figure 3:
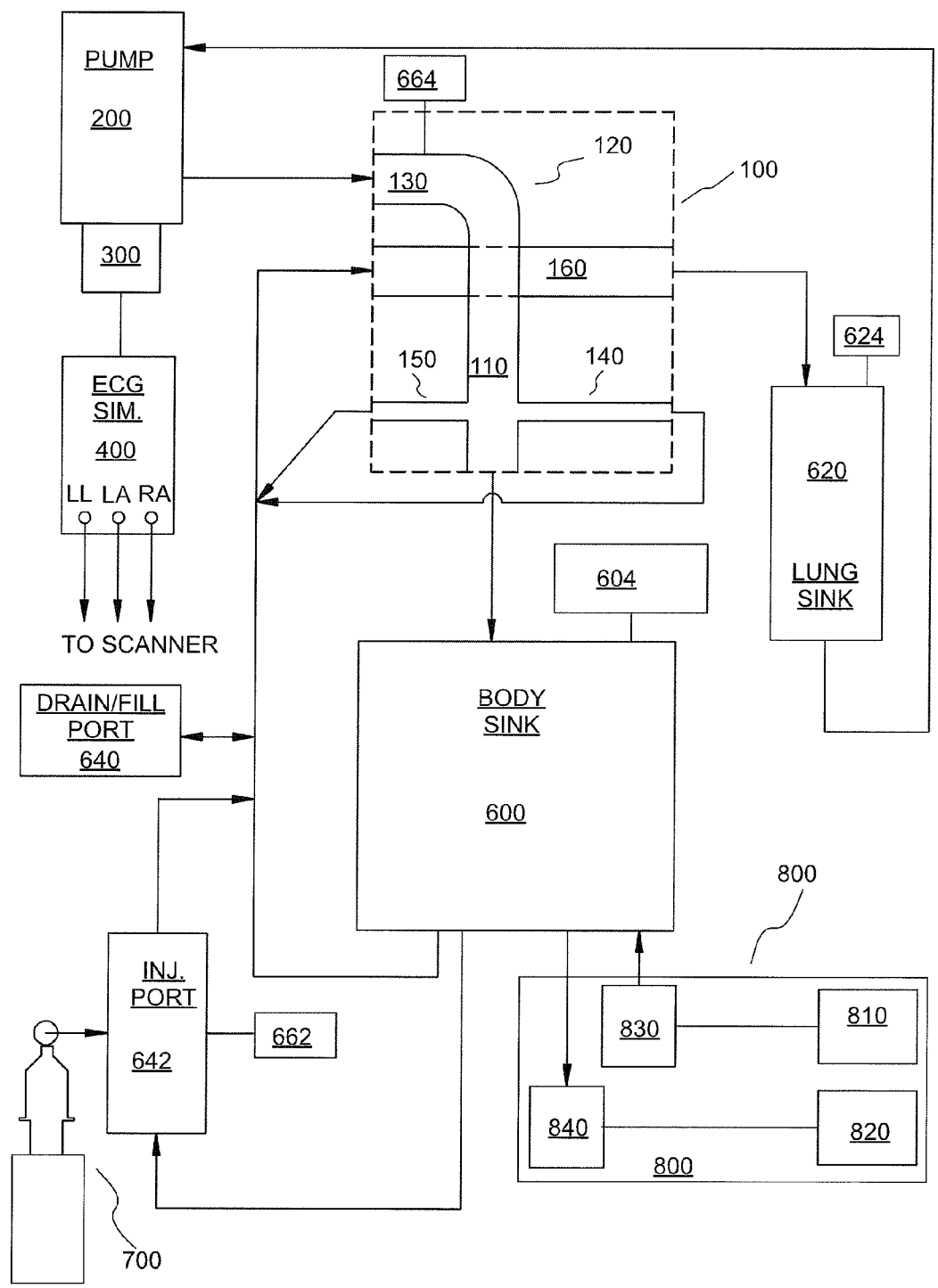
FIG. 3 illustrates a schematic or block diagram of the topology of the system of FIG. 1A.

FIG. 3 presents a block diagram or topology of system 10, including a cardiovascular model system including coronary tree model 100, a body sink 600, a lung sink 10, a right heart, and pump system 200. In the studied embodiments, coronary tree model 100 is connected to a 4 L cylindrical tube that represents systemic circulation or body sink 600. A 4 L cylindrical tube is a suitable representation for systemic circulation because steady state distribution of contrast material is not a priority. Therefore, cylindrical tube 600 is used to model the dispersive behavior of the pulmonary circulation on the contrast material.

Coronary tree model 100, body sink 600, and a lung sink 620 are connected via tubing, which is sized (for example, in diameter and length) to simulate corresponding physiological characteristics. In several studied embodiments, connecting tubing (fabricated from TYGON® plastic tubing) with approximately 1.0 cm to 2.5 cm (O.D.) was used. The lengths of a number of the connecting tubing segments are based on the constraint of the CT scanner gantry. As, for example, illustrated in FIG. 1B, pump system 200 cannot be in the cardiac field of view. Pump system 200 is preferably positioned distal to model portion 10a. The area circumscribed by the dashed rectangle in FIG. 3 is the portion or region of the model of interest during the CT studies described herein. However, entire model portion 10a is positioned on bed 510 of CT scanner 500. The components of the scanned portion of system 10 are compatible with scanner 500 and have suitable characteristics (for example, radio-opaqueness etc.) for study.

The tubing dimensions also provide physiologic pressures in system 10. For example, Tables 1 and 2 set forth the physical dimensions of the various tubing segments associated with system as illustrated in FIG. 1A.

TABLE 1

|  | External Diameter [cm] | Volume [ml] |
| --- | --- | --- |
| Pipe 1a | 2.22 | 90.5 |
| Pipe 1b | 1.91 | 24.1 |

TABLE 1-continued

|  | External Diameter [cm] | Volume [ml] |
| --- | --- | --- |
| Pipe 2 | 1.91 | 70.8 |
| Pipe 3 | 1.91 | 83.7 |
| Pipe 4 | 1.91 | 239.7 |
| Pipe 5 | 2.54 | 137.6 |
| Pipe 6a | 0.95 | 8.1 |
| Pipe 6b | 1.27 | 8.1 |
| Pipe 7 | 1.27 | 27.2 |
| Pipe 8 | 1.27 | 6.9 |
| Pipe 9 | 0.95 | 12.4 |
| Pipe 10 | 0.95 | 12.4 |
| Pipe 11 | 0.95 | 2.0 |
| Pipe 12 | 0.95 | 9.4 |
| Pulm. Artery 160 | 2.22 | 30.2 |

TABLE 2

|  | Circumference [cm] | Length [cm] | Volume [ml] |
| --- | --- | --- | --- |
| Body sink 600 | 33.0 | 672.7 | 4339.8 |
| Lung sink 620 | 29.8 | 124.8 | 805.4 |

System 10 is calibrated so that the central fluid volume provides a simulation of the mammalian (for example, human) cardiovascular circuit. The fluid volume may, for example, be set between 3 and 8 L. A number of components of system 10 are described below in connection with filling and draining procedures for system 10.

During filling of system 10, a reservoir tank 630 is filled with 3 liters (L) of water (more than 3 L may not allow sufficient pressure to be generated in system 10). Reservoir tank 620 is connected by a tube to a fill port 640. Fill port 640 and a vent 604 on body sink 600 are opened. Tubing connected to body vent 604 is placed into an empty container. A vent 624 on lung sink 620 is closed. A drain port 650 is set to a normal setting. At this point, reservoir water from reservoir tank 630 is pumped into system 10 until empty (using, for example, a pump handle 632 of reservoir tank 630). Pressure within reservoir tank 630 is then released (for example, by unscrewing a center piston in connection with handle 632 as known in the art for pressure tanks). Fill port 640 is then closed.

Reservoir tank 630 is then filled with 3 liters of water. Reservoir tank 630 is reconnected to fill port 640, which is then opened. Reservoir tank 630 is then pumped until body sink 600 is full. Fill port 640 and body vent port 604 are then closed. Tubing from lung vent port 624 is then placed into an empty container and lung vent port 624 is opened. Fill port 640 is opened and water is pumped into system 10 until lung sink 620 is full. At this point, fill port 640 is closed and lung vent port 624 is closed.

Pump system 200 is then, for example, run at 30 beats per minute (BPM), with a stroke volume of 90 ml, and a Systolic/Diastolic % of 50/50. Fill port 640 is opened. From this point forward, pressure should be monitored via one or more pressure transducer out connectors (see, for example, FIG. 4). In several embodiments, a peak pressure of 350 mmHg was not to be exceeded. A DC power source is connected to a pressure/flow data acquisition interface box 660 which is, for example, in operative connection with pressure transducers 662 and 664. A maximum voltage at pressure transducer out is established (for example, in one embodiment the maximum voltage should not exceed 2.3 VDC).

At this point, water can be added to reservoir tank 630 if, for example, an excess container has more than 400 ml of water therein. The additional water (ml) to be added can be set to equal the volume of water in the excess container (ml) minus 400 ml. Fill port 640 is opened, and lung vent 624 is opened to evacuate air. Reservoir tank 630 is pumped until system 10 has been evacuated of air. After air evacuation, fill port 640 is closed. Lung vent 624 is also closed. The total water volume in system 10 is now 5.5 liters. This volume can be adjusted as desired.

Tubing from drain port 650 is then placed into the excess container (not shown). Reservoir tank 630 is emptied. Empty reservoir tank 630 is connected to body sink vent 604. Drain port 640 is now set to "drain". Body sink vent 620 is opened and reservoir tank 630 is pumped to effect a desired system volume and to allow for additional injected volume (via an injection port 642). A graduated scale can, for example, be provided on a side of body sink 600. Drain port 640 is then once again set to normal and body sink vent 604 is closed.

To begin a drain procedure for system 10, drain tubing from drain/fill port 640 is placed into the empty excess container, which is positioned below the level of system 10. Empty reservoir tank 630 is connected to body sink vent 604, which is then opened. A drain clamp (not shown) is then opened and drain/fill port 640 to set to drain. Reservoir tank 30 is pumped to evacuate water until body sink 600 is empty. Body sink vent 604 is then closed and empty reservoir tank 630 is connected to lung sink vent 624, which is then opened. Reservoir tank 630 is pumped to evacuate the remaining water. Subsequently, pump system 200 is disconnected via connection fittings as known in the art and any remaining water is removed.

As, for example, illustrated in FIG. 3, during operation of system 10, pressurized fluid exits pump system 200 from outlet 210 thereof and enters coronary tree model 100 at descending aorta 130. The fluid passes through aortic arch 120 and enters the ascending aorta 110. A portion of the fluid entering ascending aorta 110 passes through left coronary artery 140 and right coronary artery 150 to the pulmonary artery 160. Another portion of the fluid entering ascending aorta 110 is passed to body sink 600. A portion of the fluid exiting body sink 600 passes to pulmonary artery 160. Drain fill port 640 and injection port 642 are in fluid connection within system 10 between body sink 600 and pulmonary artery 160. A fluid (for which propagation through system 10 is to be studied) is injected into system 10 via injection port 642 (for example, via manual injection or via a power injector 700 such as the STELLANT D injector available from MEDRAD, Inc. of Pittsburgh, Pa. USA). Fluid passes from pulmonary artery 160 into lung sink 620 and exits lung sink 620 return to pump system 200 at inlet 220 thereof.

Figure 5:
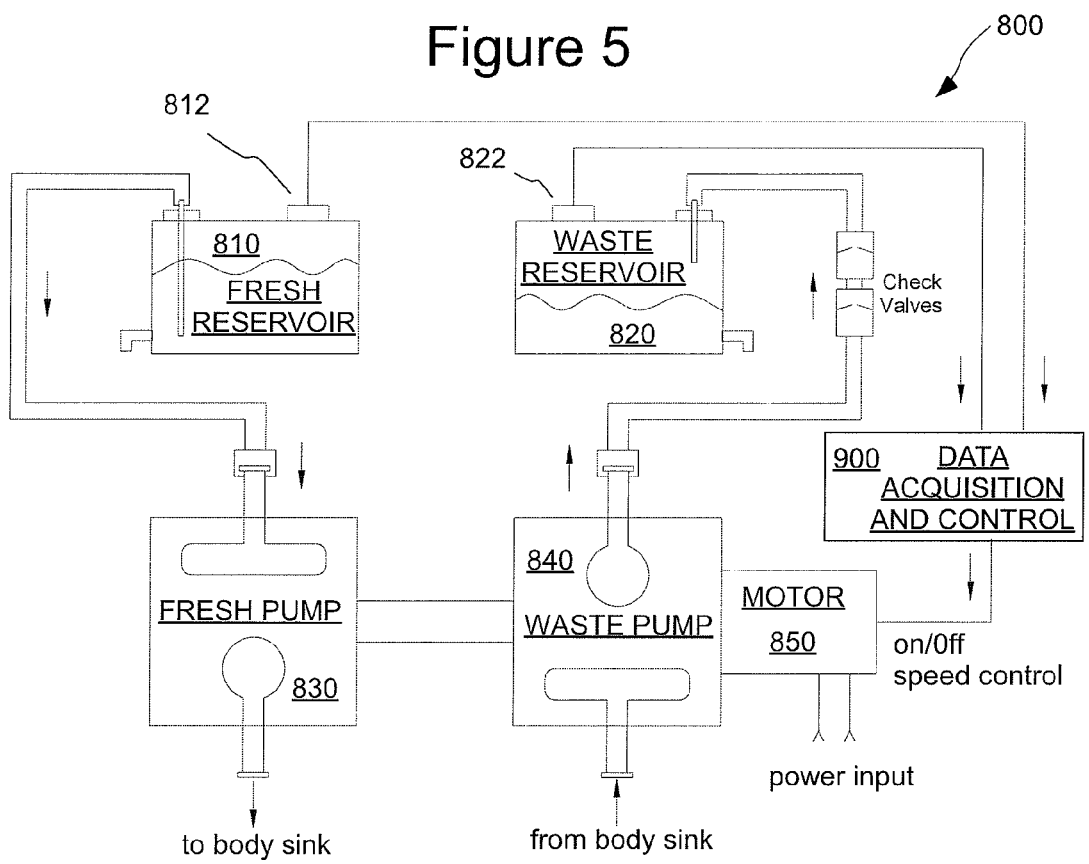
FIG. 5 illustrates a schematic or block diagram of the kidney system of FIG. 1A.

In several embodiments, a dilution, filter or kidney system 800 is used to simulate operation of the kidneys. For example, in-line pump system can be used to filter contrast or other fluid for which propagation is being studied from system 10 during and/or between experiments to simulate function of a kidney. Kidney system 800 performs the function of removing "waste products" from system 10 and regulating the fluid level therein. As described herein, a typical use of system 10 includes injecting a contrast dye into the system 10 via injection port 642. As the contrast dye is injected into system 10, the additional injected volume of the contrast fluid is added to the existing fluid in system 10. Kidney system 800 can, for example, be configured and/or controlled to remove a volume of fluid equal to the additional injected volume of fluid. In addition, as the contrast is injected into system 10, the contrast mixes with the original fluid in system 10. At some point, the mixture of the fluids reduces the usability of system 10. Kidney system 800 can be used to replenish system 10 with fresh fluid (for example, water) while also removing "waste" fluids from system 10 (thereby reducing the concentration of injected fluid within system 10). A block diagram of kidney system 800 is set forth in FIG. 5.

In the illustrated embodiment, kidney system 800 includes a first or fresh reservoir 810 containing fresh fluid (for example, a fluid having no concentration of the propagation fluid being studied—such as fresh water) to replenish system 10 and a second or waste reservoir 820 to collect waste fluid (that is, previously circulated fluid which can include some concentration of the propagation fluid) from system 10. Each of fresh reservoir 810 and waste reservoir 820 includes a fluid level sensor 812 and 822, respectively, to measure fluid levels therein. Fluid level sensor 812 is, for example, used to detect when fresh reservoir 910 is depleted and needs to be refilled. Fluid level sensor 822 is, for example, used to detect when waste reservoir 820 is full or nearly full and needs to be drained. A first fluid pumping system 830 is in fluid connection with fresh reservoir 810 to deliver fresh fluid into the system 10. A second fluid pumping system 840 is in fluid connection with waster reservoir 820 to remove excess fluid injected into system 10 and also to remove the waste fluid from the system 10. At least one motor drive 850 is in operative connection with pumping systems 830 and 840 to drive fluid pumping. Various connectors such as connecting luers and tubing as known in the art can be used to place the elements of kidney system 800 (and system 10 generally) in fluid connection to transport fluids therebetween. One or more check valves 860 can be used to ensure a desired direction of fluid flow. Kidney system 800 can be in communicative connection with a data acquisition/control system 900 of system 10, which can, for example, be used (with respect to kidney system 800) to read data from level sensors 812 and 822, to control pump motor speed and to effect on/off functions.

Pumping mechanisms suitable for use as pumping system 830 and pumping system 840 are described, for example, in U.S. Pat. Nos. 5,916,197 and 6,197,000, the disclosure of which are incorporated herein by reference. In one embodiment, pumping systems 830 and 840 were operatively connected to a common motor drive so that the amount of fluid pumped into system 10 by first pumping system 830 was always approximately equal or equal to the amount of fluid pumped out of system 10 by second pumping system 850. The flow rate of the pumping systems can be adjusted to control the filtering/dilution process. To be operative to adjust fluid volume within system 10 (for example, to remove a volume of fluid from system 10 equal to a volume injected via injection port 642 to maintain a generally constant volume of fluid in system 10) and/or to control pressure within system 10, first pumping system 830 and second pumping system 840 can be controlled separately (that is, to effect addition of or removal of a determined volume fluid from system 10).

In several embodiments, a manually adjustable automatic pressure relief system 680 was incorporated within system 10. In a number of studies, a commercially available model R-4104-10 pressure regulator available from Airtrol Components, Inc. of New Berlin, Wis. USA was used. See U.S. Pat. No. 4,315,520. Pressure relief and/or control can alternatively be accomplished by other means. For example, one or more electromechanically controlled valves can be used. Indeed, additional benefits can be realized with the use of an electromechanical valve. For example, a quicker response time to overpressure conditions can be achieved, as well as automatic control over the maximum pressure limit and pressure variability. Moreover, use of an electromechanical control valve in conjunction with data acquisition/control system 900 can provide the ability to control, monitor, store and analyze performance data.

Figure 6:
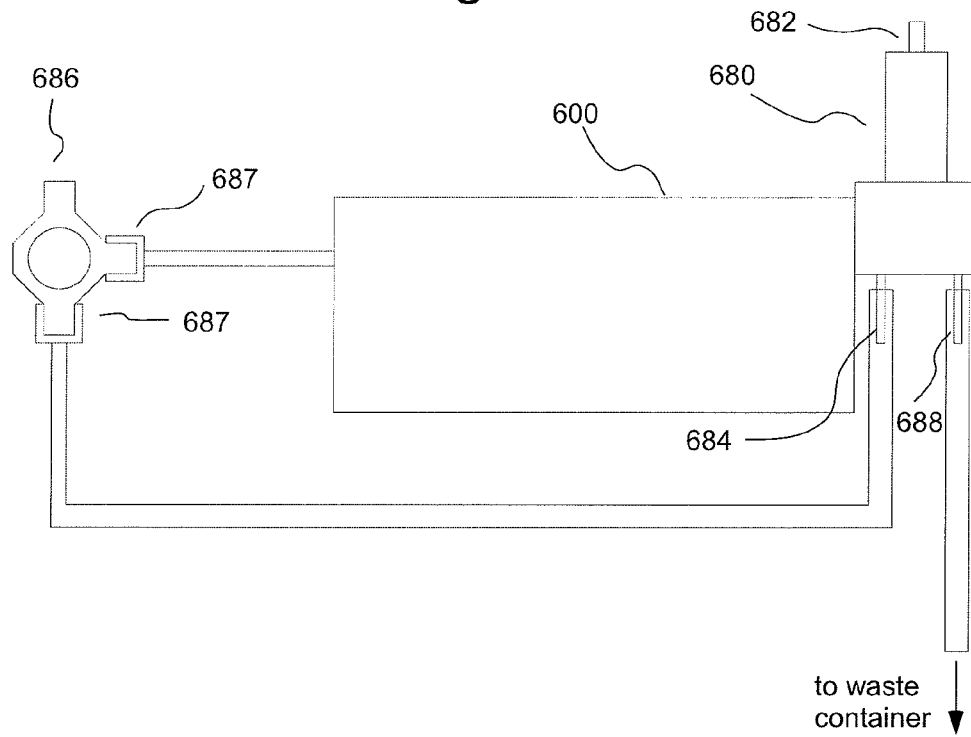
FIG. 6 illustrates a schematic or block diagram of a pressure relief system of FIG. 1A.

FIG. 6 illustrates a schematic or block diagram of the connections of the pressure relief regulator/system 680 to body sink 600 of system 10. Pressure relief system 680 can, for example, be a manual 20-turn adjustable device. Pressure in system 10 can, for example, be increased as an adjustment element 682 (for example, a knob) is turned clockwise. Pressure relief system 680 provides the ability to precisely adjust peak pressure settings (for example, approximately 120 mmHG during operation of system 10) and to provide a relatively quick response time to overpressure conditions.

In the embodiment illustrated in FIG. 6, a pressure inlet port 684 of pressure relief system 680 is placed in fluid connection with body sink 600 via tubing, a stop cock 686 and connectors such as luer connectors 687. An exhaust output port 688 of pressure release system 680 is placed in fluid connection with a waste container.

Pressure relief system 680 alleviates several potential issues with the use of system 10. For example, as system 10 is being prepared for initial use (that is, during filling and priming) an overpressure condition can be encountered. Pressure relief system 680 assists in preventing overpressures that can potentially cause failures in fittings and/or damage to compliant coronary tree model 100.

Furthermore, without pressure relief system 680, contrast injected into system 10 during a power injection can increase the pressure to undesirable levels. Once again, fittings/connectors could fail and/or coronary tree model 100 could be damaged. Moreover, without the use of pressure relief system 680 during an injection, control of the system pressure to be within a physiological blood pressure range (for example, set to 120/80 mmHg) is difficult in that system pressure can increase significantly during and after the injection.

Figure 7A:
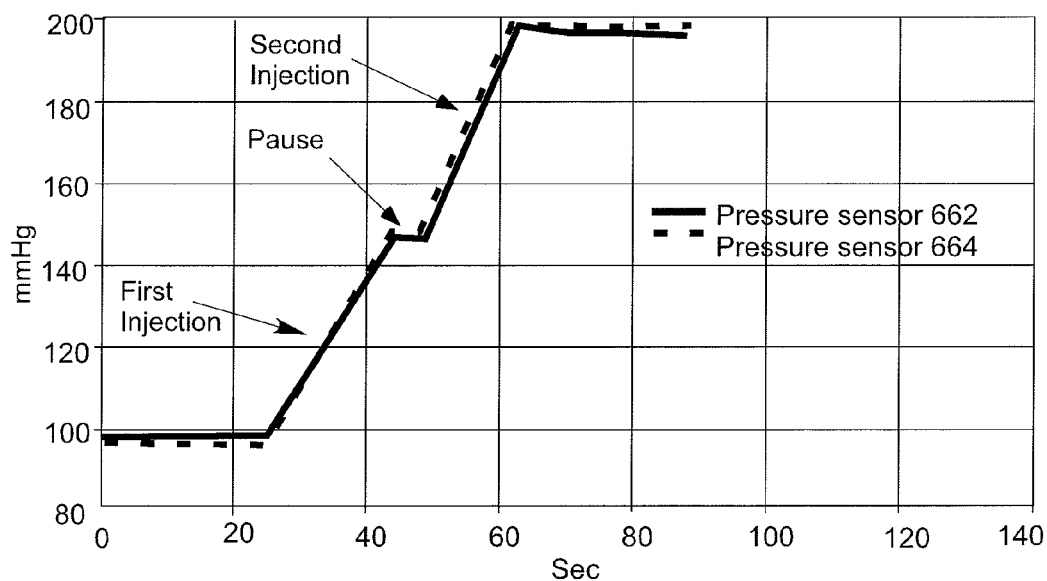
FIG. 7A illustrates a graph of measured pressure in the system of FIG. 1A during an injection protocol including two injections separated by a pause without use of a pressure relief system.
Figure 7B:
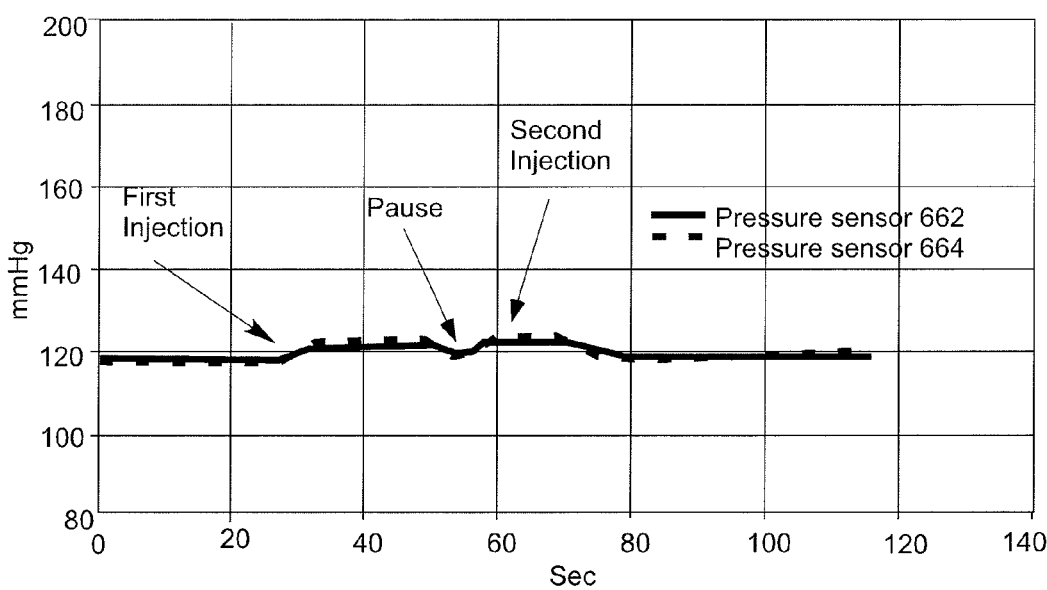
FIG. 7B illustrates a graph of measured pressure in the system of FIG. 1A during an injection protocol including two injections separated by a pause with use of a pressure relief system in fluid connection with the air side of the body sink of the system
Figure 7C:
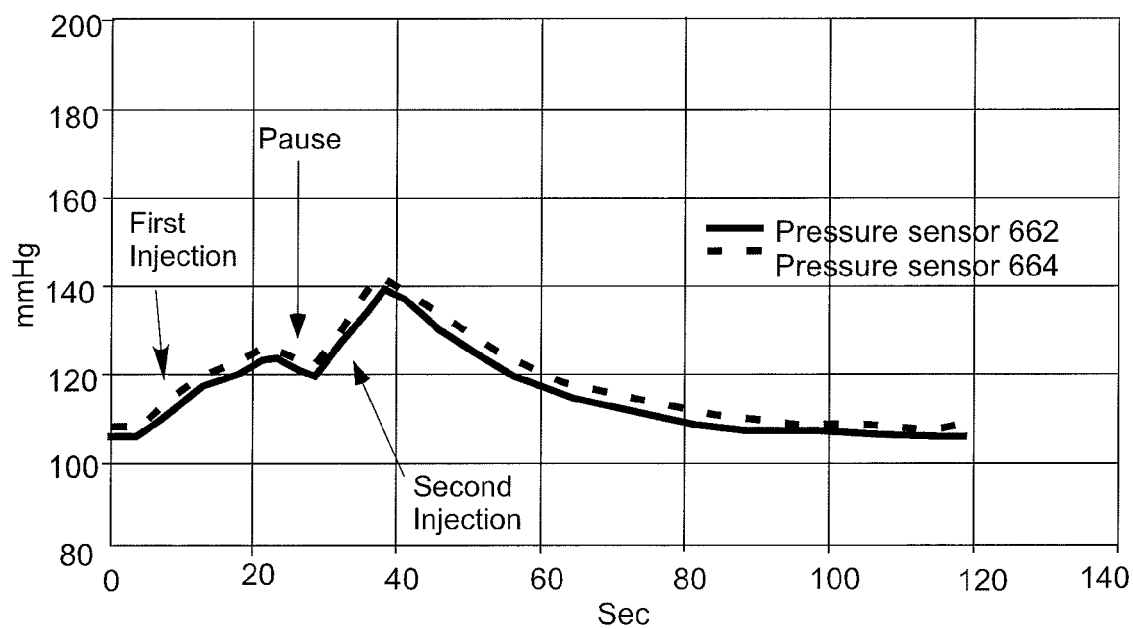
FIG. 7C illustrates a graph of measured pressure in the system of FIG. 1A during an injection protocol including two injections separated by a pause with use of a pressure relief system in which fluid is removed from the system as opposed to air.

Several experiments were conducted to measure the effectiveness of pressure relief system 680. FIG. 7A illustrates measured pressure during an injection protocol including a first injection with a STELLANT power injector at a rate of 4 mL/sec of 75 ml, followed by a pause of 5 sec and a second injection at 8 mL/sec of 75 mL into system 10 without use of pressure relief system 680. As illustrated, system pressure rises quickly. The same injection protocol was followed in the study of FIG. 7B with the use of pressure relief system 680 at the air side of body sink 600. As illustrates, pressure within system 10 remains relatively constant. FIG. 7C illustrates result for the same injection protocol wherein fluid is vented rather than air. As illustrated in FIG. 7C, venting fluid as opposed to air, diminishes the effectiveness of pressure relief. The use of an electromechanical pressure relief system In connection with fluid removal will, however, at least partially restore the effectiveness of the pressure relief system.

Cardiac output can be adjusted from, for example, 2.5 L/min to 8 L/min based on the setting provided by (Harvard) pump system 200. Measurements of flow rate are made within system 10 by one or more flow rate sensors 690 such as in-line, ultrasonic transducers. Suitable flow rate sensors are, for example, available from Transonic Inc., if Ithaca, N.Y. USA. Once again, intravascular pressure is measured with pressure transducers such as pressure transducers 662 and 664. An example of a suitable pressure transducer is the model PX35D pressure sensor available from Omega Inc, of Stamford, Conn. USA.

Figure 4:
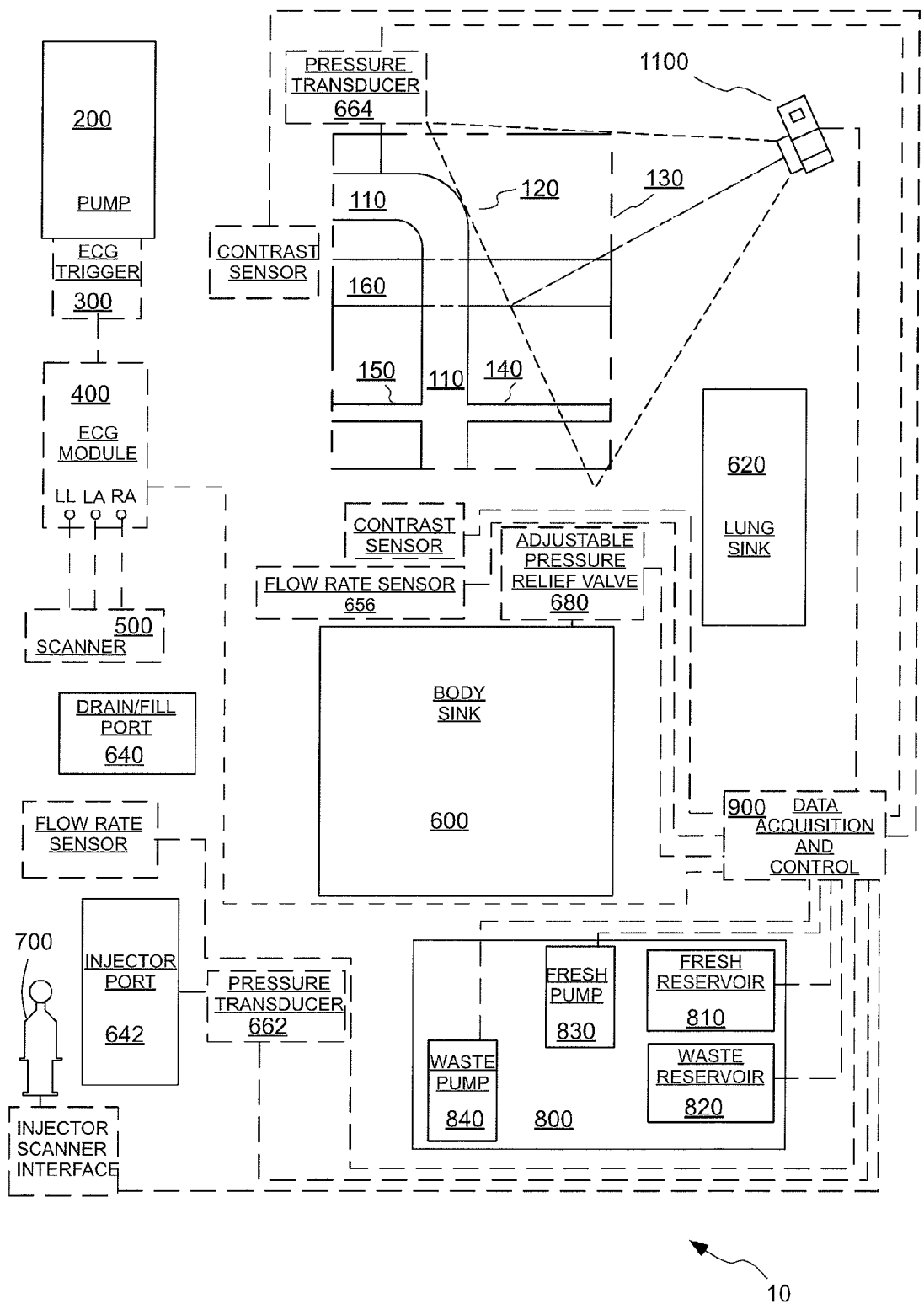
FIG. 4 illustrates a schematic or block diagram of a sensor system, a data acquisition system and a control system of the system of FIG. 1A.

Analog data from transducers or sensors, along with the ECG triggering pulse can, for example, be acquired with data acquisition (DAQ) hardware/software system which can from a part of data acquisition/control system 900. Suitable data acquisition systems are for example, available from National Instruments of Austin, Tex. USA (NIDAQ). Data acquisition/control system 900 can, for example, also include one or more processors (for example, one or more microprocessors) and associated memory, display etc. as known in the art. Data acquisition/control system 900 can, for example, include a desktop or laptop computer in communicative connection with data acquisition hardware. FIG. 4 illustrates the interconnection of various sensor and control systems with data acquisition/control system 900. In FIG. 4, the flow lines between the flow components of system 10 have are absent to prevent confusion.

Figure 9:
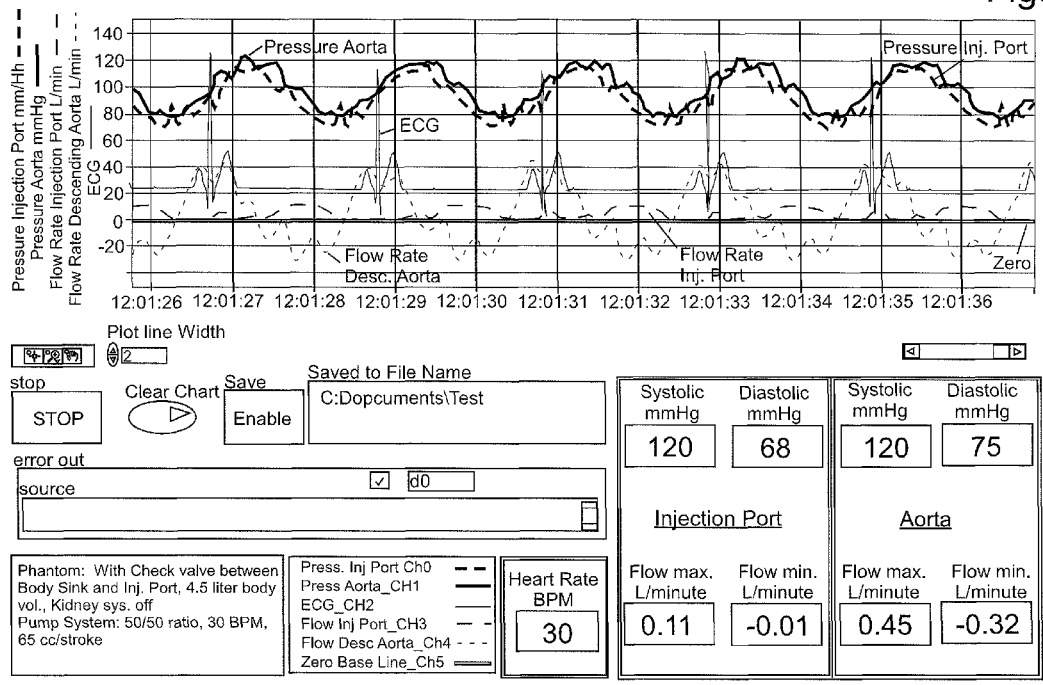
FIG. 9 illustrates a screen capture of a display of data capture from the system of FIG. 1A.

The fluid level or volume, forced pressure and pump settings of system 10 are readily configurable to keep the fluid (blood emulant) pressure within typical physiologic limits, for example, 70 mmHg diastolic pressure to 120 mmHg systolic (see, for example, FIG. 9). Pressure in system 10 is readily adjusted through control of the amount of fluid and air introduced to the system from reservoir 630 and through control of pressure relief system 680 and/or kidney system 800 as set forth above. Cardiac volumetric flow rate typical of humans is readily configurable in system 10 by adjusting, for example, stroke volume (ml/stroke) [for example, between 60-100 ml/stroke] and stroke frequency (strokes/minute) [for example, between 50-80 strokes/minute] of pulsatile pump system 200. A total fluid (blood emulant) volume typical of the central blood volume in humans (for example, approximately 3 L to 8 L) is readily maintained in system 10. Furthermore, the ability to readily alter pressures and flows within the system 10 also allows for experimentation and validation of contrast material injection techniques for humans that have pathological conditions resulting in hemodynamic parameters outside normal ranges (over the full range of possible parameter values).

The design of the phantom system was adjusted to mimic the convective transport delay of contrast material typical in humans for a particular region of interest. The dimensions and volumes of components of system 10 (for example, as set forth in Table 1) were determined by empirical study and mathematical modeling (using known engineering principles) to achieve desired transport delays of contrast in humans. It is typical, for example, for contrast to arrive in the pulmonary artery 8-13 seconds after the start of contrast injection. Further, contrast material typically arrives in the coronary arteries 15-22 seconds after the start of contrast injection. In several embodiments, the delay from the injection site to the simulated pulmonary artery in system 10 ranges from approximately 5-12 seconds, as is typical in humans. Furthermore, the delay of contrast from the simulated pulmonary artery to the simulated coronary arteries and thoracic artery ranges from approximately 6-18 seconds. It is important, when evaluating contrast injection protocols, for the arrival of contrast in such regions of interest to be representative of the delay encountered in the human cardio-pulmonary circuit. Scanning should be commensurate with the arrival of the contrast bolus in a desired region of interest. In light of the studies of system 10 (which has not been fully optimized), methods and protocols validated using system 10 are applicable for use on humans.

As described above, system 10 can be used to study the propagation of virtually any type of fluid that can be detected using one or more detection systems. In that regard, any fluid for which concentration (or a variable related to concentration) can be detected using a sensor can be studied in the present invention. The sensor can be embodied in a scanner system such as a CT scanner, an MRI scanner, an ultrasound scanner etc. as known in the medical imaging arts, which are suitable for measuring contrast enhancement (which is related to contrast concentration). Other types of sensors (for example, represented by contrast sensors and light imaging system 1100 in FIG. 4) can be used. In the case of a light sensor or a light imaging system (for example, a digital camera system or an infrared sensor), a detectable dye can be used as the injection fluid. A fluid of similar properties (for example, similar density, similar viscosity etc.) to a fluid for which it is desired to study propagation through system 10 can be used (for example, to reduce cost or reduce risk to a user). Moreover, various additives can be added to a fluid to facilitate study/detection of the propagation thereof.

ECG Enhancement:

As described above, system 10 includes ECG simulator system 100 to provide a synchronized ECG scanner-gating signal to scanner 500. Implementation of the ECG signal into system 10 was achieved in several embodiments using a signal modifier system in communication with simulator 400 (such as a BIO-TEK ECG Plus simulator) and trigger system 300 in operative connection with pump system 200. A typical ECG simulator transmits a non-synchronized, continuous ECG output waveform. In the case of system 10, electromechanical modifications provide an ECG gating implementation.

A first modification requires generating a synchronizing pulse signal from pump 200 and transmitting the signal to ECG simulator/system 400. Referring, for example, to FIGS. 1A, 1C, 1D, 3 and 4, trigger system 300 is connected to pump 200 and includes a micro switch mechanical interface, which uses the normally open contacts.

Figure 8:
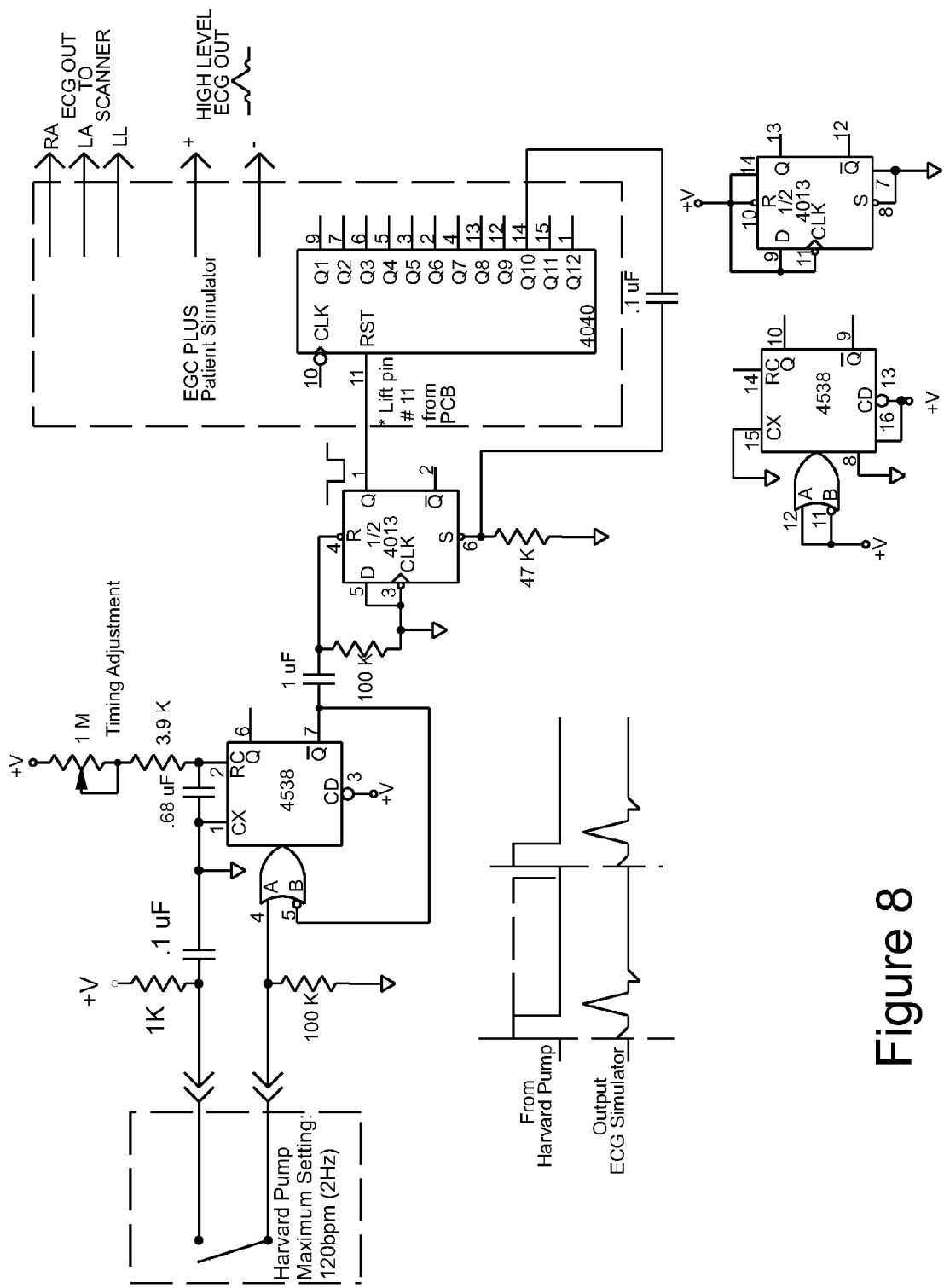
FIG. 8 illustrates a schematic representation of the processing system and control system of the ECG simulator of the system of FIG. 1A.

A second modification requires the addition of electronics to ECG simulator 400. Referring to FIG. 8, a processing/control system is connected to ECG simulator 400. The processing system includes a controller which receives the signal from pump system 200 and triggers and synchronizes the aortic pressure activity to the ECG electrical activity. The controller allows for fine-tuning of the timing between the ECG R-wave and the start of the aortic pressure rise within the cardiac cycle.

Figure 2:
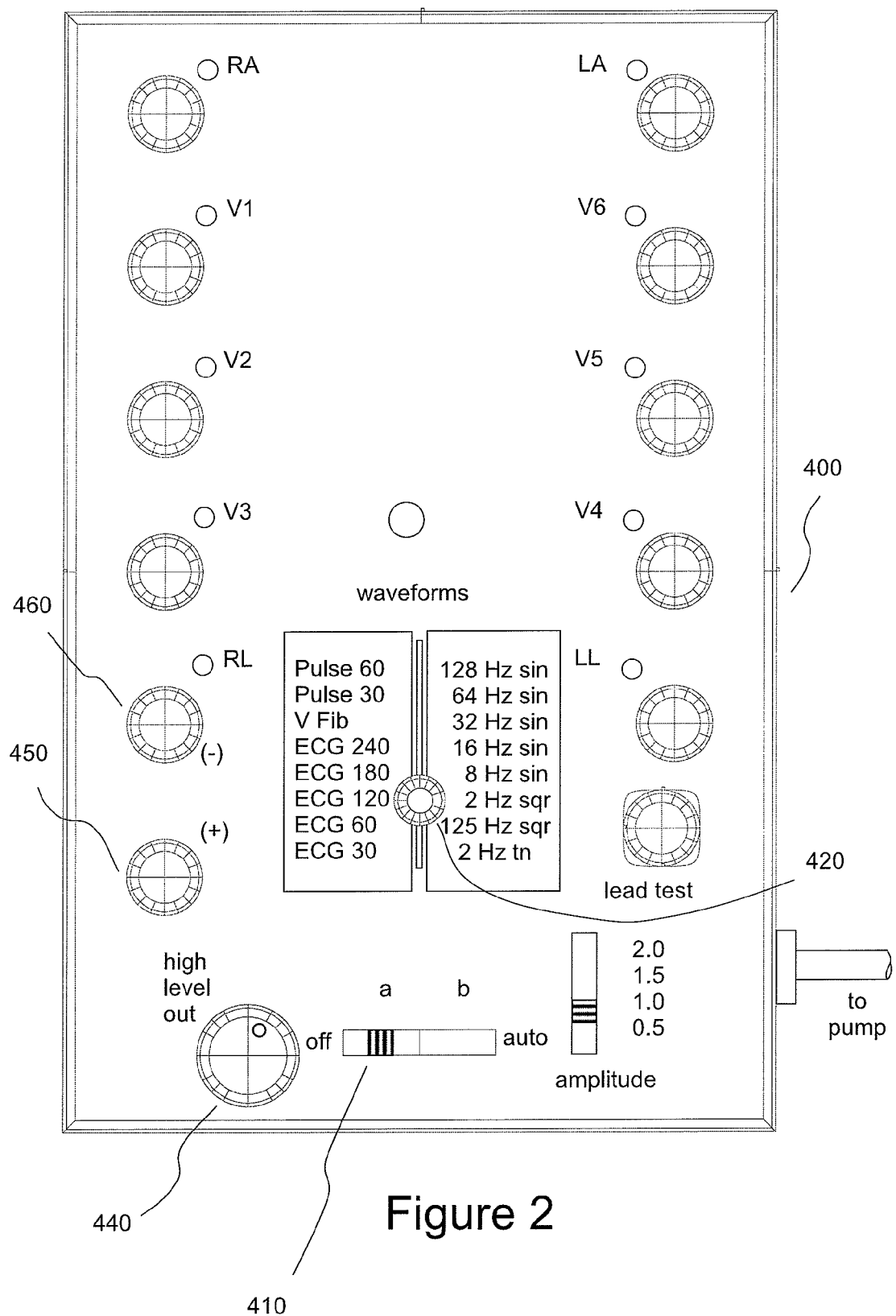
FIG. 2 illustrates a front view of a front panel of the ECG simulator of the system of FIG. 1A.

Referring to FIG. 2, ECG simulator 400 front panel controls are configured as follows for correct operation: (1) set waveform slide switch 410 to ECG 120; (2) set Off/a/b/Auto slide switch 420 to "a"; (3) connect signal cable 430 from pump 200 to ECG simulator 400 (see FIGS. 1A and 1B); and (4) monitor the aortic pressure signal and the ECG waveforms to set timing control knob 440 accordingly.

A high level output signal of ECG simulator 400 can be obtained at + and − connectors 450 and 460, respectively, on the front panel of ECG simulator 400. The output signal is at a level sufficient to enable data acquisition. This signal can be used with a data acquisition system to monitor, store and analyze the ECG signal. FIG. 9 sets forth an example of a data acquisition capture in which pressure at injection port 642, pressure in the aorta, flow rate at injection port 642, flow rate in the descending aorta and ECG are set forth over a period of approximately 10 seconds. Standard scanner ECG gating signals (RA, LA, LL) can also be obtained from ECG simulator 400 and transmitted to scanner 500.

Figure 10A:
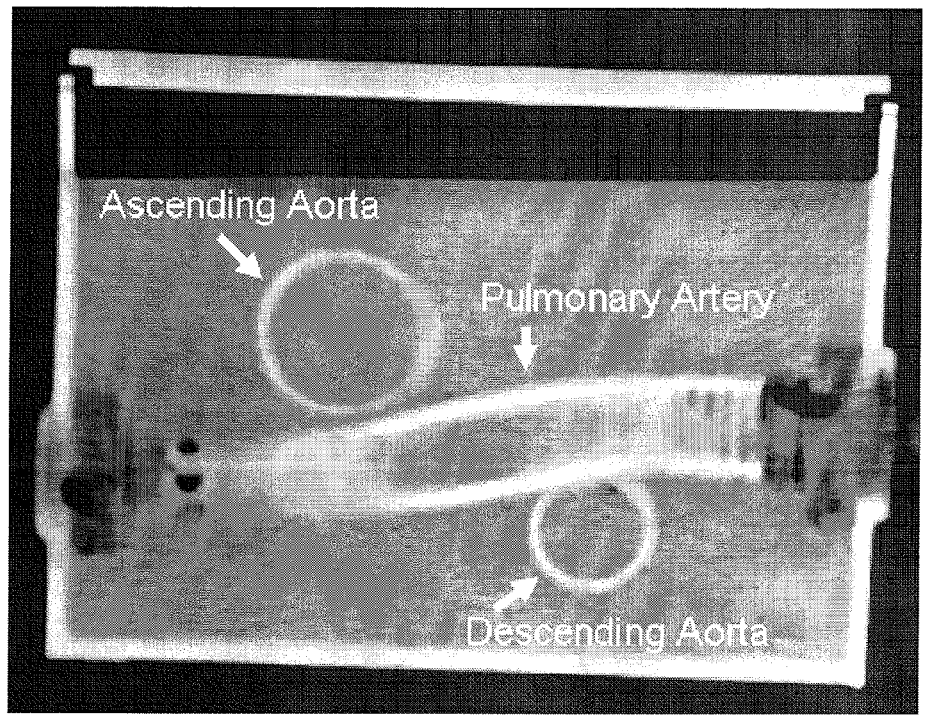
FIG. 10A illustrates a CT scan of the coronary tree model of the system of FIG. 1A before contrast delivery.
Figure 10B:
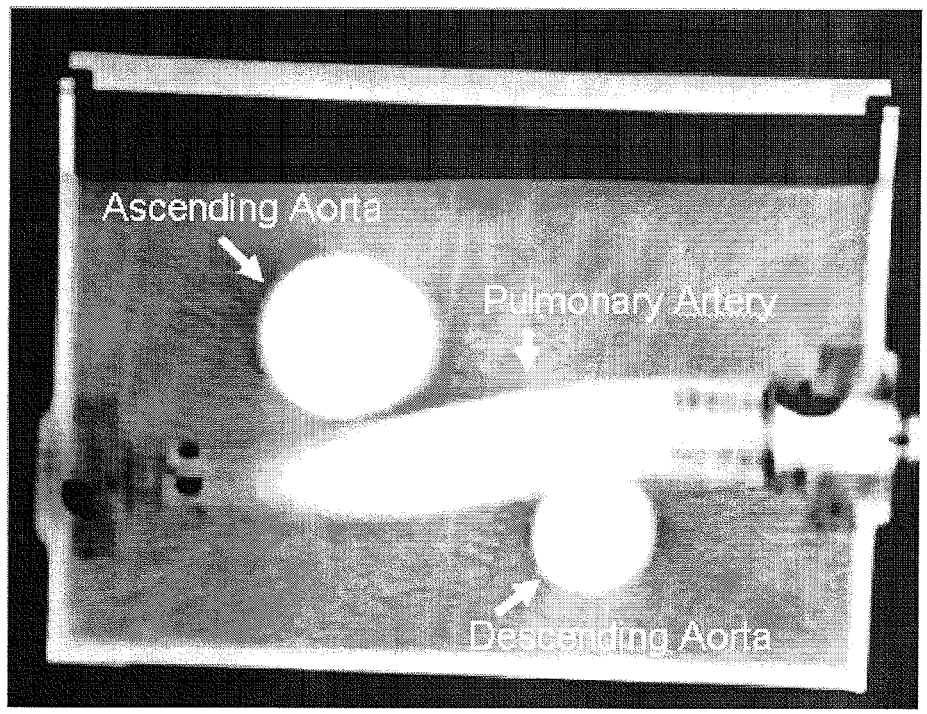
FIG. 10B illustrates a CT scan of the coronary tree model of the system of FIG. 1A after contrast delivery.

FIGS. 10A and 10B display a pre-contrast axial CT image and a post-contrast CT image acquired with a 64 slice MSCT scanner (SOMATOM SENSATION 64 available from Siemens, of Forscheim Germany) and displaying the pulmonary artery in relation to the emulated ascending and descending aorta. In CT studies herein, coronary tree model 100 was encased by a water filled acrylic container 180 (see FIGS. 1A and 1B) that mimicked the CT-attenuation characteristics of the mediastinum.

To demonstrate the ability of system 10 to reflect the effects on contrast bolus morphology and transport, several injection and imaging experiments were designed with a Siemens 64-Slice SOMATOM SENSATION 64 CT scanner. Bae et al demonstrated the linearity (additive) time invariant properties of contrast pharmacokinetics with respect to injection duration. See Bae, K. T., "Peak contrast enhancement in CT and MR angiography: when does it occur and why? Pharmacokinetic study in a porcine model," *Radiology*, 2003. 227(3): p. 809-16. It is expected for a linear system, that the contrast enhancement pattern resulting from an injection of a long duration (measured at one-level in the vasculature) should be a linear superposition of injections with shorter durations.

The experiments of Bae et al were replicated by performing subsequent bolus injections into the phantom using a power injector (the STELLANT D injector available from MEDRAD, Inc. of Pittsburgh, Pa. USA) and measuring the resulting enhancement pattern at a fixed level in a region of interest of system/model 10a (that is, the pulmonary trunk). Bolus injections of iopromide 370 mgV ml (ULTRAVIST 370 available from Bayer Schering Pharmaceutical of Berlin, Germany) lasting 5, 10, 15 and 20 seconds were repeated at injection flow rates of 4, 5 and 6 ml/s. The phantom/system parameters used in this experiment are set forth in Table 3. The scans were acquired every second from 2 seconds post injection to 40 seconds post injection.

TABLE 3

| BPM | Stroke Vol [ml] | Sys/dia % | Contrast [mgI/ml] | Inj. Flow [ml/s] | Inj. Vol [ml] | Injection Duration [sec] |
|---|---|---|---|---|---|---|
| 50 | 90 | 40/60 | 370 | 4 | 20 | 5 |
| 50 | 90 | 40/60 | 370 | 4 | 40 | 10 |
| 50 | 90 | 40/60 | 370 | 4 | 60 | 15 |
| 50 | 90 | 40/60 | 370 | 4 | 80 | 20 |
| 50 | 90 | 40/60 | 370 | 5 | 25 | 5 |
| 50 | 90 | 40/60 | 370 | 5 | 50 | 10 |
| 50 | 90 | 40/60 | 370 | 5 | 75 | 15 |
| 50 | 90 | 40/60 | 370 | 5 | 100 | 20 |
| 50 | 90 | 40/60 | 370 | 6 | 30 | 5 |
| 50 | 90 | 40/60 | 370 | 6 | 60 | 10 |
| 50 | 90 | 40/60 | 370 | 6 | 90 | 15 |
| 50 | 90 | 40/60 | 370 | 6 | 120 | 20 |

Experimental Results

To test the linear predictive value of a test bolus, an imaging experiment was executed in which 20 ml of iopromide 370 mgI/ml was injected at 4 ml/s and followed by a saline flush of 50 ml. A time enhanced curve (TEC) was measured in the ascending aorta. Another injection of 80 ml at 4 ml/s was performed and the resulting TEC was measured. FIG. 9 demonstrates the fidelity of system 10 to replicate intravascular diastolic and systolic pressures. System 10 generates vascular pressures in the realm expected for a healthy human undergoing cardiac CT angiography.

Linearity Results

Figure 11A:
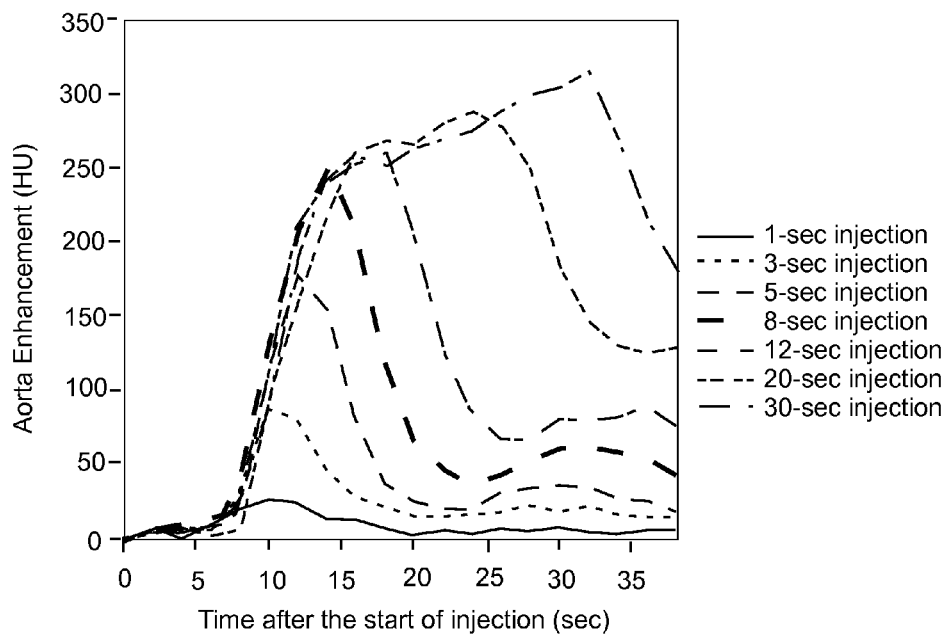
FIG. 11A illustrates time enhancement curves from porcine studies set forth in Bae, K. T., "Peak contrast enhancement in CT and MR angiography: when does it occur and why? Pharmacokinetic study in a porcine model," *Radiology*, 2003. 227(3): p. 809-16.
Figure 11B:
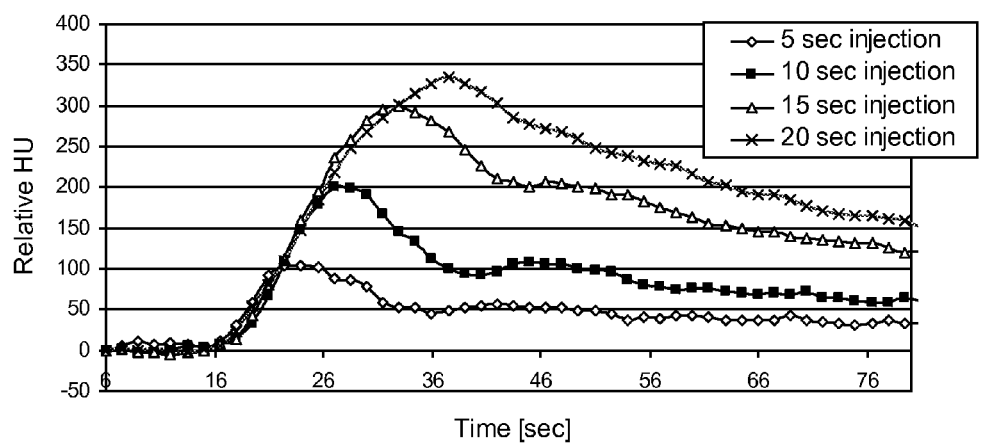
FIG. 11B illustrates time enhancement curves generated using a cardiovascular for system of the present invention.

FIG. 10A illustrates a CT scan of coronary tree model 100 of system 10 before contrast delivery, while FIG. 10B illustrates a CT scan of coronary tree model 10 after contrast delivery thereto. Data from the Bae et al. porcine model are presented in FIG. 11A. Bae, K. T., "Peak contrast enhancement in CT and MR angiography: when does it occur and why? Pharmacokinetic study in a porcine model," *Radiology*, 2003. 227(3): p. 809-16. FIG. 11B sets forth comparative data recorded from system 10 at an injection flow rate 4 ml/sec.

Figure 12A:
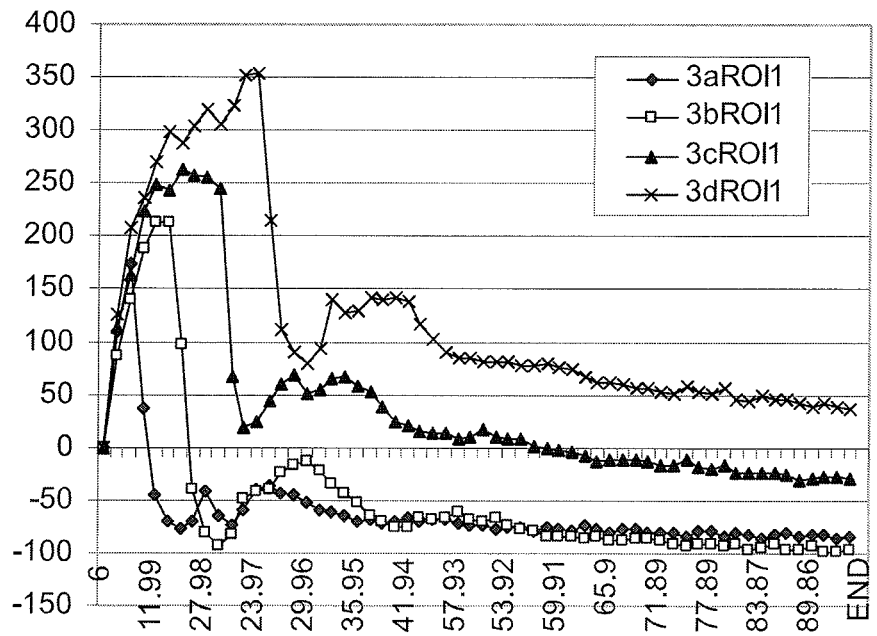
FIG. 12A illustrates a graph of the results of a linearity injection for contrast at 6 ml/s (5, 10, 15, and 20 second) for the pulmonary trunk.
Figure 12B:
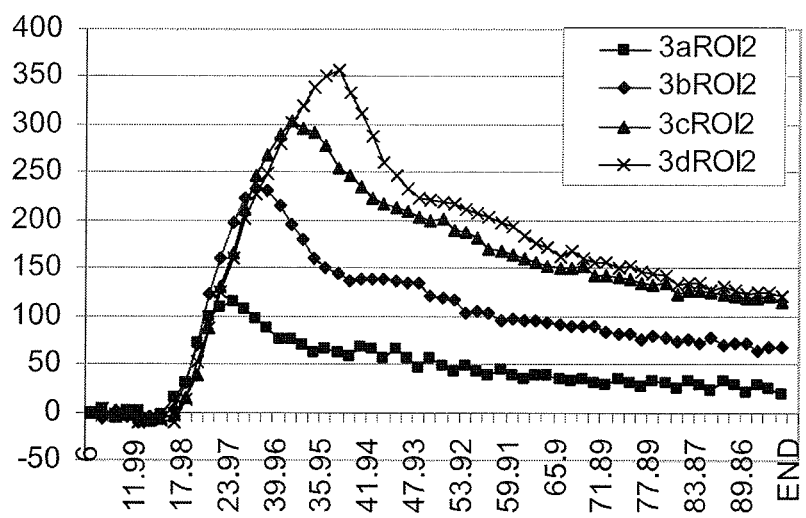
FIG. 12B illustrates a graph of the results of a linearity injection for contrast at 6 ml/s (5, 10, 15, and 20 second) for the ascending aorta.

The results of the linearity injection for contrast at 6 ml/s (5, 10, 15, and 20 second) are illustrated in FIG. 12A (for the pulmonary trunk ROI) and in FIG. 12B (for the ascending aorta ROI). The same trend as seen for the 4 ml/s is apparent. The 20 second injection, however, exhibits some non-linearity at the peak of the enhancement curve for the ascending aorta. The similar morphology of the rising slope across all injection durations is expected and demonstrates the repeatability of studies with system 10.

Identification Experiments

Figure 13A:
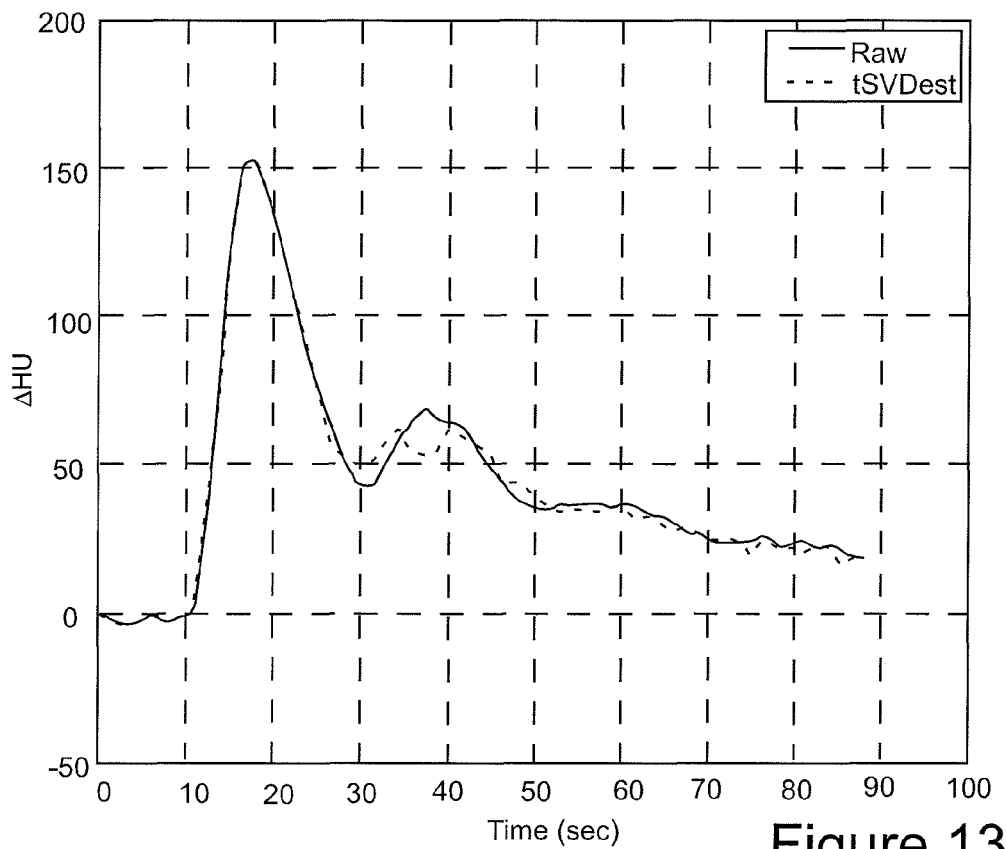
FIG. 13A illustrates a graph of a measured time enhancement curve in the ascending aorta generated using a cardiovascular flow system of the present invention and a predicted time enhancement curve generated by applying an estimated transfer function construction.

FIG. 13A illustrates data from experiments evaluating the ability of a non-parametric model (generated via a truncated Singular Value Decomposition deconvolution) to estimate the transfer function between the injection site and enhancement measurements made in the ascending aorta.

The measurement from a 20 ml test bolus was used to construct a transfer function for the system. The resulting enhancement prediction (using 20 ml bolus as the input) is plotted against the actual signal in FIG. 13A. Good agreement was observed between the estimated output and the measured enhancement.

Figure 13B:
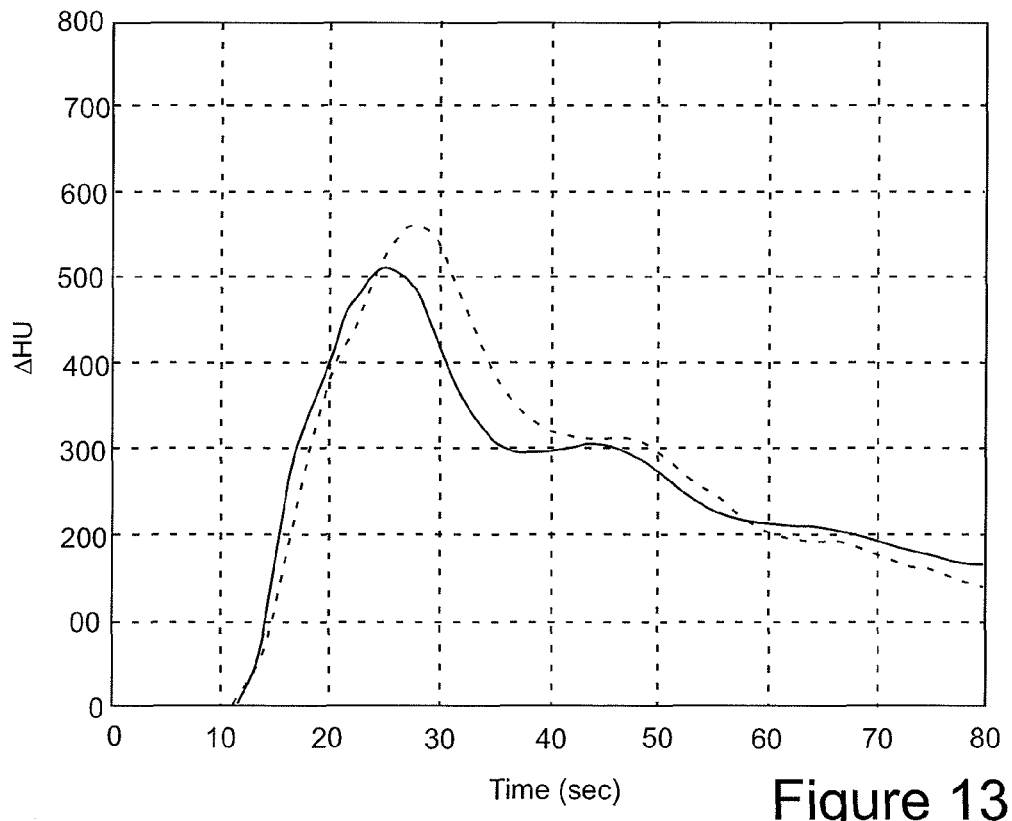
FIG. 13B illustrates a graph of a measured time enhancement curve in the ascending aorta generated using a cardiovascular flow system of the present invention and a predicted time enhancement curve generated by applying a transfer function estimated with a truncated singular value decomposition deconvolution technique.

Having an estimated transfer function, a predicted enhancement pattern was generated for an 80 ml injection. The resulting prediction is set forth in FIG. 1B and is plotted with the measured enhancement in the ascending aorta from an 80 ml bolus. There is an overestimation of the predicted enhancement in the studies of FIG. 13B.

Visual Example

An example of contrast enhancement visualization is presented in FIG. 1C discussed above. The reconstruction of coronary tree model 100 of system 10 was generated from data acquired during a helical acquisition at 64 slice MSCT.

The foregoing description and accompanying drawings set forth the preferred embodiments of the invention at the present time. Various modifications, additions and alternative designs will, of course, become apparent to those skilled in the art in light of the foregoing teachings without departing from the scope of the invention. The scope of the invention is indicated by the following claims rather than by the foregoing description. All changes and variations that fall within the meaning and range of equivalency of the claims are to be embraced within their scope.

What is claimed is:

1. A cardiovascular flow system, comprising:
   (a) a model of a cardiovascular system, the model including cardiac anatomy inclusive of a pulmonary artery that crosses a coronary artery tree of the cardiac anatomy;
   (b) a pump system for enabling a carrier fluid to be propagated through the model;
   (c) an ECG simulator system in communicative connection with the pump system, the ECG simulator system being adapted to create and transmit a simulated ECG signal, the ECG simulator system using a signal received from the pump system to adjust the simulated ECG signal transmitted from the ECG simulator system; and
   (d) an injection port to enable an injection fluid to be injected into the model, the injection port adapted to be placed in fluid connection with an injector to inject the injection fluid into the model;
   wherein, as the carrier fluid and the injection fluid flow through the model as a result of the pump system, at least the injection fluid is detectable by an imaging system as the injection fluid flows through at least one region of interest of the model.

2. The cardiovascular flow system of claim 1 wherein the model simulates mammalian physiologic hemodynamic parameters.

3. The cardiovascular flow system of claim 1, wherein the hemodynamic parameters comprise systolic pressure, diastolic pressure and convective transport of the injection fluid from the injection port to the at least one region of interest within the model.

4. The cardiovascular flow system of claim 1, wherein the model simulates a mammalian anatomy for the at least one region of interest.

5. The cardiovascular flow system of claim 4, wherein the at least one region of interest comprises the coronary artery tree and a thoracic aorta.

6. The cardiovascular flow system of claim 1, wherein motion occurs within the at least one region of interest as a result of pulsatile flow of at least one of the carrier fluid and the injection fluid therethrough.

7. The cardiovascular flow system of claim 1, wherein the ECG simulator system includes a processing system to synchronize the simulated ECG signal to the signal received from the pump system.

8. The cardiovascular flow system of claim 1, wherein the ECG simulator system includes a controller adapter to adjust timing between the simulated ECG signal and the signal received from the pump system.

9. The cardiovascular flow system of claim 1, wherein the pump system includes a sensor adapted to provide the signal from the pump system.

10. The cardiovascular flow system of claim 1, wherein the ECG simulator system interfaces with a scanner to transmit the simulated ECG signal to the scanner.

11. The cardiovascular flow system of claim 1, further including a lung sink and a body sink in fluid connection within the model.

12. The cardiovascular flow system of claim 11, wherein interconnections within the cardiovascular flow system are formed to simulate at least one of physiology and anatomy.

13. The cardiovascular flow system of claim 12, wherein the interconnections are selected to simulate physiologic pressure.

14. The cardiovascular flow system of claim 1, further comprising a kidney simulation system in fluid connection with the model.

15. The cardiovascular flow system of claim 14, wherein the kidney system comprises a first pump system to pump fresh fluid into the cardiovascular flow system and a second pump system to pump fluid out of the cardiovascular flow system.

16. The cardiovascular flow system of claim 15, wherein the kidney simulation system is controlled to control at least one of fluid volume and pressure within the cardiovascular flow system.

17. The cardiovascular flow system of claim 1 further comprising a pressure relief system to prevent pressure within the cardiovascular flow system from exceeding a predetermined pressure.

18. The cardiovascular flow system of claim 17, wherein the pressure relief system is adapted to maintain pressure within the cardiovascular flow system within limits of physiologic pressure.

19. The cardiovascular flow system of claim 1, further comprising the injector.

20. A method of simulating flow of an injection fluid through a mammalian cardiovascular system, the steps of the method comprising:
   (a) providing a model of a cardiovascular system of a mammal, the model comprising a cardiac anatomy and a pulmonary artery crossing the cardiac anatomy, the model further comprising an injection port adapted to be placed in fluid connection with an injector to inject the injection fluid into the model;

(b) pumping a carrier fluid through the model to enable propagation of the carrier fluid through the model inclusive of the cardiac anatomy and the pulmonary artery;

(c) configuring a desired cardiac output and heart rate of the cardiovascular system by adjusting at least a stroke volume and a stroke frequency of the pumping;

(d) generating an ECG signal for the cardiovascular system that is synchronized with a trigger signal associated with the pumping;

(e) injecting the injection fluid into the model via the injection port; and (f) detecting the injection fluid in at least one region of interest within the model as the carrier fluid and the injection fluid flow through the model as a result of the pumping.

21. The method of claim 20, wherein the ECG signal is synchronized with the trigger signal based on an aortic pressure generated within the cardiac anatomy by the pumping.

22. The method of claim 20, further comprising scanning the at least one region of interest of the model with an imaging system to produce an image and thus enable generation of at least one time enhancement curve representative of propagation of the injection fluid through the at least one region of interest.

23. The method of claim 22, wherein the injection fluid comprises a contrast medium.

24. The method of claim 20, wherein the model includes a body sink and a lung sink in fluid connection with the cardiac anatomy and the pulmonary artery.

25. The method of claim 24, wherein the body sink and the lung sink are in fluid connection with the cardiac anatomy and the pulmonary artery via tubing adapted to simulate physiological pressures.

26. A cardiovascular flow system, comprising:
(a) a model of a cardiovascular system, the model comprising a cardiac anatomy and a pulmonary artery crossing the cardiac anatomy;
(b) a pump system for enabling a carrier fluid to be propagated through the model inclusive of the cardiac anatomy and the pulmonary artery;
(c) an injection port to enable an injection fluid to be injected into the model, the injection port adapted to be placed in fluid connection with an injector to inject the injection fluid into the model; and
(d) a kidney system in fluid connection with the model, the kidney system comprising a first pump system to pump fresh carrier fluid into the model and a second pump system to filter at least one of the injection fluid and an other fluid out of the model;
wherein, as the carrier fluid and the injection fluid flow through the model as a result of the pump system, at least the injection fluid is detectable by an imaging system as the injection fluid flows through at least one region of interest of the model.

27. The cardiovascular flow system of claim 26, wherein the first pump system and the second pump system are controlled to prevent fluid volume increase within the cardiovascular flow system upon injection of at least one of the carrier fluid, the injection fluid and the other fluid into the model via the injection port.

28. The cardiovascular flow system of claim 26, wherein the kidney system is controlled to control pressure within the cardiovascular flow system.

29. A cardiovascular flow system, comprising:
(a) a model of a cardiovascular system, the model comprising a cardiac anatomy and a pulmonary artery crossing the cardiac anatomy;
(b) a pump system for enabling a carrier fluid to be propagated through the model inclusive of the cardiac anatomy and the pulmonary artery;
(c) an injection port to enable an injection fluid to be injected into the model, the injection port adapted to be placed in fluid connection with an injector to inject the injection fluid into the model; and
(d) a pressure relief system to prevent pressure within the cardiovascular flow system from exceeding a predetermined pressure;
wherein, as the carrier fluid and the injection fluid flow through the model as a result of the pump system, at least the injection fluid is detectable by an imaging system as the injection fluid flows through at least one region of interest of the model.

30. The cardiovascular flow system of claim 29, wherein the pressure relief system is adapted to maintain pressure within the cardiovascular flow system within limits of physiologic pressure.

31. A cardiovascular flow system, comprising:
(a) a model of a cardiovascular system for simulating anatomy and physiology, the model including cardiac anatomy inclusive of a pulmonary artery that crosses a coronary tree of the cardiac anatomy;
(b) a pump system for enabling a carrier fluid to be propagated through the model;
(c) an ECG simulator system in communicative connection with the pump system, the ECG simulator system being adapted to create and transmit a simulated ECG signal, the ECG simulator system using a signal received from the pump system to adjust the simulated ECG signal transmitted from the ECG simulator system; and
(d) an injection port to enable an injection fluid to be injected into the model, the injection port adapted to be placed in fluid connection with an injector to inject the injection fluid into the model;
wherein as the carrier fluid and the injection fluid flow through the model as a result of the pump system, the cross of the coronary tree by the pulmonary artery enables acquisition of imaging scans thereof in which an enhancement pattern mimics that of a pulmonary trunk of a human cardiovascular system.

* * * * *

UNITED STATES PATENT AND TRADEMARK OFFICE
CERTIFICATE OF CORRECTION

PATENT NO. : 8,608,484 B2
APPLICATION NO. : 12/397713
DATED : December 17, 2013
INVENTOR(S) : Kalafut et al.

Page 1 of 1

It is certified that error appears in the above-identified patent and that said Letters Patent is hereby corrected as shown below:

IN THE SPECIFICATION:

In Column 8, Lines 34-35, delete "Reservoir tank 620" and insert -- Reservoir tank 630 --, therefor.

In Column 9, Line 25, delete "Reservoir tank 30" and insert -- Reservoir tank 630 --, therefor.

Signed and Sealed this
Twenty-second Day of April, 2014

Michelle K. Lee
*Deputy Director of the United States Patent and Trademark Office*